United States Patent [19]

Frankel et al.

[11] 3,763,475

[45] Oct. 2, 1973

[54] STORED PROGRAM COMPUTER WITH PLURAL SHIFT REGISTER STORAGE

[75] Inventors: Stanley P. Frankel, Los Angeles; Francis Robert Monroe, Woodland Hills, both of Calif.

[73] Assignee: TallyMate Corporation, Newport Beach, Calif.

[22] Filed: Apr. 12, 1972

[21] Appl. No.: 243,300

[52] U.S. Cl. .............................................. 340/172.5

[51] Int. Cl. .............................................. G06f 13/02

[58] Field of Search .................................. 340/172.5

[56] References Cited

UNITED STATES PATENTS

| | | | |
|---|---|---|---|
| 3,585,600 | 6/1971 | Saltini | 340/172.5 |
| 3,404,377 | 10/1968 | Frankel | 340/172.5 |
| 3,248,528 | 4/1966 | Campeau | 340/172.5 X |
| 3,116,410 | 12/1963 | La Manna | 340/172.5 |
| 3,469,244 | 9/1969 | Perotto | 340/172.5 |
| 3,593,313 | 7/1971 | Tomaszewski | 340/172.5 |

*Primary Examiner*—Paul J. Henon
*Assistant Examiner*—Sydney R. Chirlin
*Attorney*—John T. Matlago

[57] ABSTRACT

A stored program computer is disclosed which comprises a working memory including a plurality of short shift registers each of which has its output connected to its input to provide for normally recirculating its content without change. Instructions and data are stored in specified locations of the short shift registers and the computer operates during a nonexecute cycle of the short shift registers to read an instruction from a selected one of the short shift registers and to perform the instruction during an execute cycle of the computer. The computer further comprises a bulk memory including a plurality of long shift registers each of which has its output connected to its input to provide for normally recirculating its content without change. The capacity of each long shift register is equal to the capacity of a number of short shift registers. One of the instructions stored in the short shift registers of the working memory is operable during a number of execute cycles of the computer to exchange the content of a selected one of the long shift registers with the content of a number of the short shift registers. This latter exchange provides for changing the program stored in the working memory so that the computer will now operate on data stored in the short shift registers in accordance with the new program.

23 Claims, 20 Drawing Figures

FIG. 17.
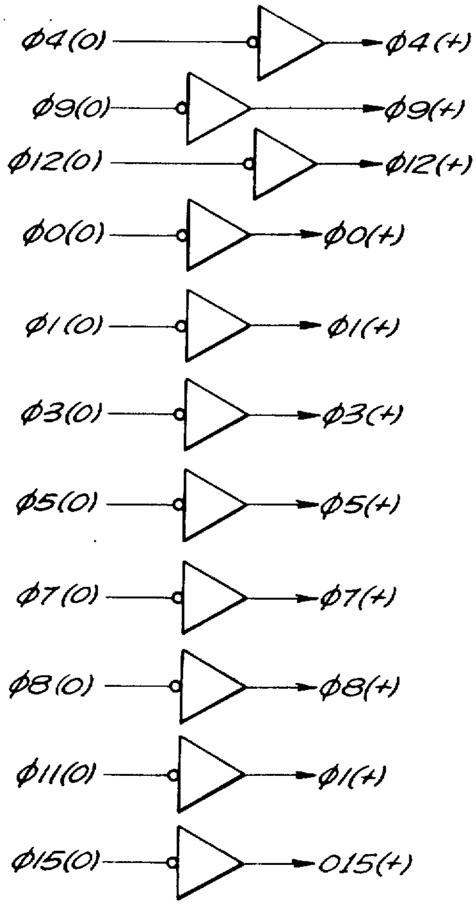
FIG. 16.
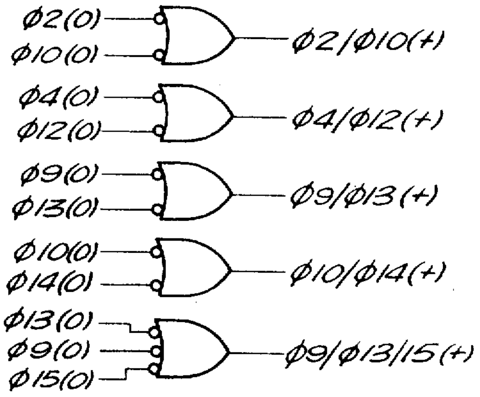
FIG. 19.
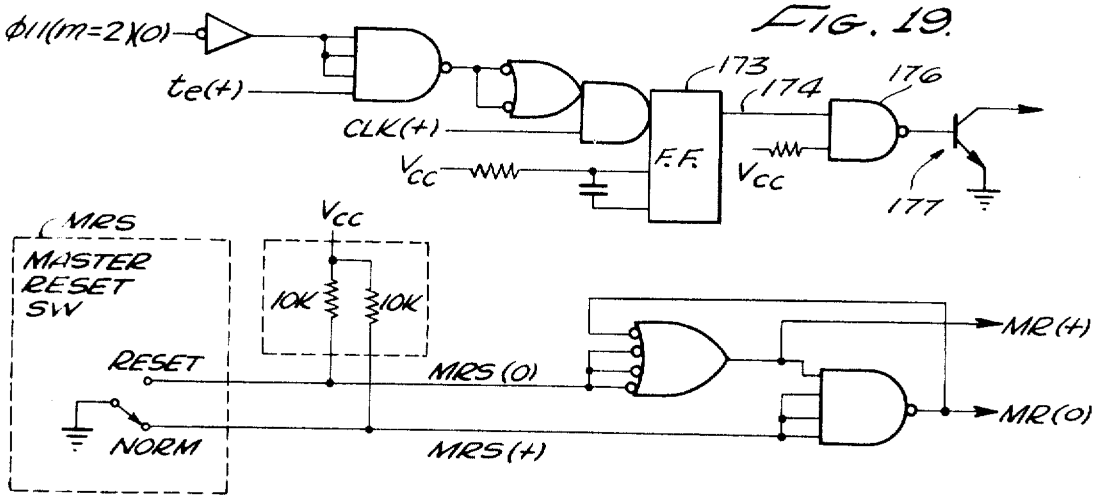
FIG. 18.

STORED PROGRAM COMPUTER WITH PLURAL SHIFT REGISTER STORAGE

This invention relates to a stored program data processor and, more particularly, to a data processor which provides only a few simple, basic, built-in orders for use by a programmer in preparing a program therefor.

It is known that the difficulty of preparing a program for a data processor is dependent to a great extent upon the nature of the set of orders built in the processor. Generally, the more the orders are oriented to apply to a particular application of the processor the easier the task of the user in preparing a program therefor. However, such orders are more complex and require a larger number of circuit components for their implementation. Further, such orders are not readily adapted to provide programming with the same ease for other applications of the processor.

When a data processor is provided with only a few simple, basic, built-in orders, the program of instructions for sequencing the orders as well as the data being operated upon have to be made available from the memory and changed more frequently during the course of the program; and it is therefore important for this information to be accessed from the memory of the processor in a fast and efficient manner so as to avoid causing the timing of the processor to suffer. Furthermore, since programs of instructions involving many long sequences of orders must be stored in the memory of the processor to provide sufficient software for obtaining the desired overall processing on the data, it is of advantage in lowering the cost of the processor to keep the size of the instructions small, i.e., to use as few bits as possible to specify the address of the registers in the memory wherein the orders and data are located. However, when the address is limited to a few binary bits, the addressing is limited to selecting from a relatively small number of memory registers.

Accordingly, the present invention provides a working memory comprised of a number of short recirculating registers, the number being such that any one of the registers can be selected by the bit combinations provided by the "short" address. The information in the selected register is thus made available for processing. This working memory is backed up by a bulk memory comprised of a number of long recirculating registers. The capacity of each long recirculating register is equivalent to a plurality of the short recirculating registers. Thus, one of the orders of the processor of the present invention provides for exchanging information stored in one of the long recirculating registers of the bulk memory with information stored in a plurality of the short recirculating registers of the working memory. The exchange is performed so that the programmer in preparing the program of instructions always knows in which of the short recirculating registers in the working memory the instructions and data being sought are stored.

At the time the processor is being loaded with information in preparation for processing of data, the programmer has provided for storing the program of instructions and data which is to be currently operated upon in a plurality of the short recirculating registers of the working memory. Additionally, the programmer provides for a different program of instructions to be stored in each of the long recirculating registers of the bulk memory. Inasmuch as the processor can only operate to process the data stored in the working memory in accordance with the program of instructions stored in the working memory, whenever it is desired to switch the processor to enable it to perform a different program of instructions on data stored in the working memory, the memory exchange order is performed. As a result, the program of instruction previously used in the working memory is now stored in a selected one of the long recirculating registers of the bulk memory, and the new program of instructions transferred from the long recirculating register is now available for use in the plurality of short recirculating registers of the working memory. Any time it is desired in the course of the operation of the processor to provide for switching back to the prior processing, the programmer need merely again specify the same memory exchange order which will operate to return the original program of the instruction to the working memory. In this manner the processor can be made to operate with any one of a large number of different programs of instructions.

Accordingly, one of the objects of the present invention is to provide a processor which makes available a minimum of simple, basic, built-in orders for use in preparing a program therefor.

Another object of the invention is to provide for selectively connecting any one of a number of short recirculating registers comprising a working memory of a processor so that the data therein can be stepped through a logical network, wherein it may be modified in accordance with one of the orders provided for in the processor.

Another object of the invention is to provide a simple arrangement for setting up an instruction register with information received from any one of a number of short recirculating registers selected in accordance with information in an instruction address register.

Another object of the invention is to provide an order for a processor which operates to exchange information stored in a long recirculating register of a bulk memory with information stored in a plurality of short recirculating registers of a working memory.

Another object of the invention is to provide a stored program data processor which provides a minimum of simple, basic, built-in orders and thus shifts the burden of preparing the program onto the programmer.

Another object of the invention is to provide a data processor which simplifies the addressing of data as stored in a bulk memory.

Another object of the invention is to provide a memory arrangement for a data processor, whereby a large amount of information can be accessed from a working memory by use of a short address.

Another object of the invention is to provide for simplying the addressing of information as stored in a number of long recirculating registers of a bulk memory by providing for exchanging the information in a selected one of the long recirculating registers with information stored in a plurality of short recirculating registers of a working memory.

Another object of the invention is to provide circuitry in a processor for exchanging a program of instructions currently being stored in a plurality of short recirculating registers of a working memory with a different program of instructions being stored in any one of a number of long recirculating registers of a bulk memory.

An additional object of the invention is to provide means and methods of accomplishing the foregoing operations with a minimum of required circuitry and cost.

The specific nature of the invention as well as other features, advantages, uses, and objects thereof, will become apparent from the following detailed description of an exemplary embodiment of a data processing system in accordance with the invention and from the accompanying drawings for said embodiment in which:

FIG. 16 is an electrical network for combining the order codes.

FIG. 17 is an electrical network for inverting individual order code signal.

FIG. 18 is a schematic diagram of the master reset switch circuit.

FIG. 19 shows a diagram of an electrical circuit driver for a cash drawer; and

Like characters and symbols designate like elements throughout the description and the figures of the drawings.

GENERAL DESCRIPTION

Figure 1:
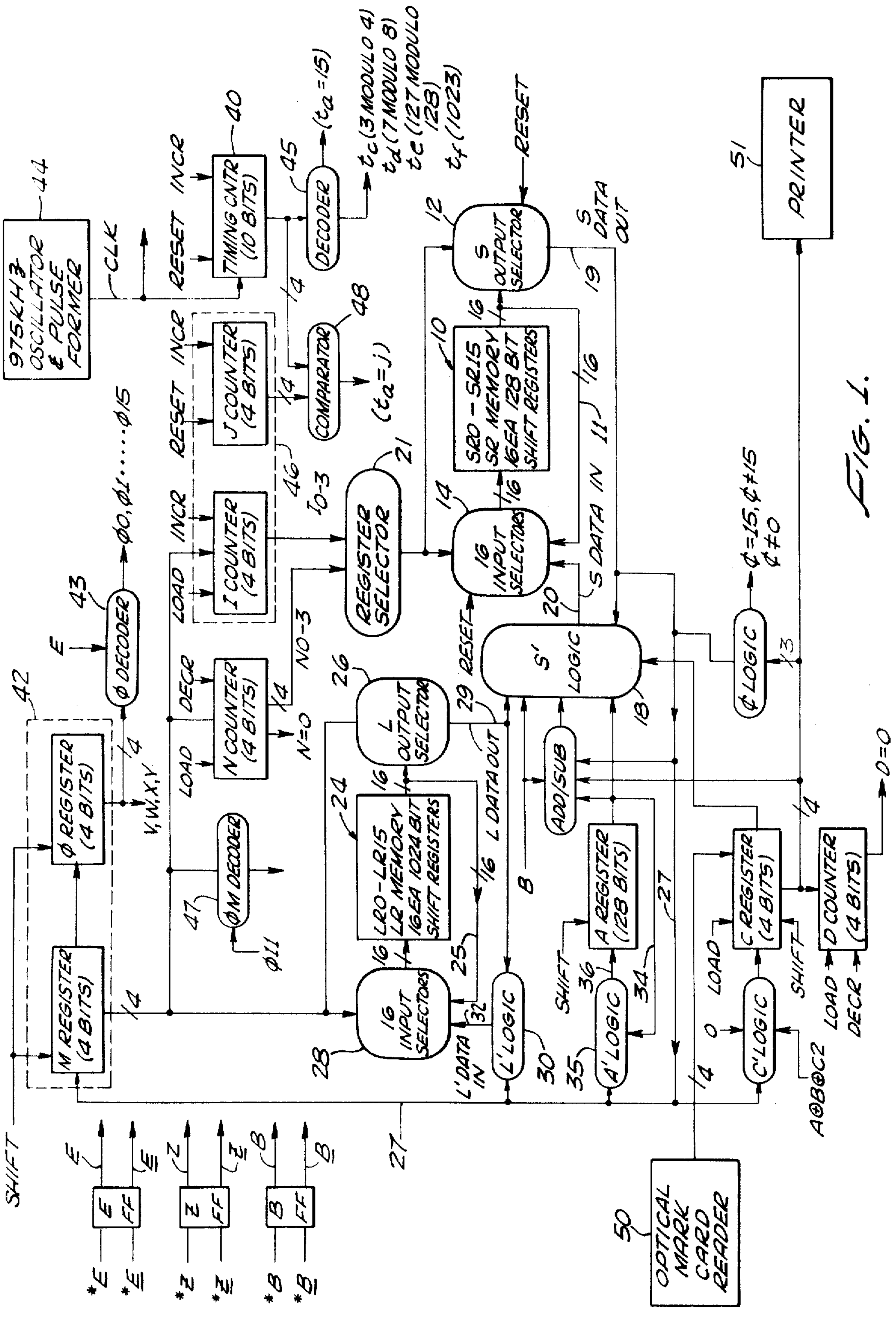
FIG. 1 is a general, overall block and schematic diagram of the data processor of the present invention.

Reference will first be made to FIG. 1 which shows a general overall block diagram of the data processor of the present invention. The data processor includes a working memory 10 comprised of 16 short shift registers designated SRO to SR15, inclusive. Each of the short shift registers, generally designated SR, is comprised of a series circuit arrangement of 128 integrated circuit flipflops with the flipflop corresponding to the least significant bit position of each of the registers respectively connected, as schematically indicated by path 11, to shift its content into the flipflop corresponding to the most significant bit position of each of the registers. Each of the short shift registers SR thus operates to recirculate data stored therein by each flipflop stepping data to the following flipflop in response to clock pulses designated CLK as generated by a 975 KHZ oscillator and pulse forming circuit 44. It should be noted that each of the short shift registers SR stores and usually recirculates without change 128 bits which for some purposes will be regarded as forming a word of 32 four-bit characters or 16 two-character instructions.

The working memory 10 is provided with an output selector 12 having 16 inputs, each of which is respectively connected to the output of one of the short shift registers SR and an input selector 14 having sixteen outputs, each of which is respectively connected to the gating input of one of the short shift registers SR. The output selector 12 has a single S data out line 19 which is connected to an S' logic network 18, and the input selector 14 has a single S' data in line 20 which is connected to receive data from the S' logic network 18.

A register selector 21 is connected to the output selector 12 and the input selector 14. As will be described later in connection with FIG. 3, a four-bit address received in the register selector 21 provides for setting the output selector 12 and the input selector 14 so that the output of one of the short shift registers SR designated by the four-bit address is selected to route its data by way of the S data out line 19 to the S' logic network 18 where the data can be modified and then transferred by way of S' data in line 20 into the input selector 14 which directs the data to the input of the selected short shift register SR.

It should now be clearly understood that normally the data being stored in each of the short shift registers SR of the working memory 10 is being steadily and synchronously recirculated therein without change. However, the register selector 21 provides for being able to select any one of the short shift registers SR to route its data thorugh the S' logic network 18 wherein it may be modified during its recirculation in accordance with the program.

The data processor also includes a bulk memory 24 comprised of sixteen long shift registers designated LRO to LR15, inclusive. Each of the long shift registers, generally designated LR, is in the form of a shift register comprised of a series circuit arrangement of 1024 integrated circuit flipflops with the flipflop corresponding to the least significant bit position of the register connected, as schematically indicated by path 25, to shift its content into the flipflop corresponding to the most significant bit position of the register. Thus, similarly to the short shift registers SR in the working memory 10, the long shift registers LR in the bulk memory 24 operate to recirculate data stored therein by each flipflop stepping its content to the following flipflop in response to a clock pulse CLK.

The bulk memory 24 is provided with an output selector 26 having sixteen inputs, each of which is connected to a respective output of one of the long shift registers LR and an input selector 28 having sixteen outputs, each of which is connected to a respective gating input of one of the long shift registers LR. The output selector 26 has a single L data out line 29 which is connected to supply data to an L' logic network 30, and the input selector 28 has a single L' data in line 32 which is connected to receive data from the L' logic network 30.

An M register which forms a part of instruction register 42 is connected to the output selector 26 and the input selector 28 of the bulk memory 24. As will be described later, a four-bit address set in the M register provides for setting the output selector 26 and the input selector 28 such that the output of one of the long shift registers LR, designated by the four-bit address, routes its data by way of L data out line 29 into the L' logic network 30 wherein the data can be modified, and then transferred by way of L' data in line 32 to the input selector 28 which directs the data into the input of the selected long shift register LR.

It should now be clearly understood that normally the data stored in each of the long shift registers LR of the bulk memory 24 is being steadily and synchronously recirculated therein without change. However, the M register provides for being able to select any one of the long shift registers LR to route its data through the L' logic network 30 wherein it may be modified during its recirculation.

In addition to the sixteen short shift registers SR of the working memory 10, an additional short shift register designated A is provided. The short shift register A, which may also be called the accumulator register, is comprised of a series circuit arrangement of 128 integrated circuit flipflops with the flipflop corresponding to the least significant bit position of the register A connected by way of a path 34 to A' logic network 35, wherein the data may be left unchanged or may be modified and then routed by A' data in line 36 into the flipflop corresponding to the most significant bit position of the register A. Thus, similarly to and in synchronism with the short shift registers SR, the short shift register A typically provides for steadily shifting and recirculating its contents by each flipflop stepping data to the following flipflop in response to the clock pulses CLK. This short shift register A plays a central role in most operations. It should be particularly noted that the 16 short shift registers SR and the short shift register A comprise the short shift registers in contrast with the long shift registers LR which provide the capacity for bulk storage of data not in current use. A memory exchange order, Memex 08, provides for the exchange of the information in half the short shift register SR of the working memory 10 with the information in one of the long shift registers LR of the bulk memory 24.

The timing for the data processor is provided by a 10-bit timing counter 40 comprised of a series circuit arrangement of flipflops t0 – T9, inclusive. The timing counter continually responds to clock pulses CLK generated by the oscillator and pulse forming circuit 44 to advance through a total count of 1024 bits after which it recycles. The outputs of the flipflops of the timing counter 40 are decoded in decoder 45 to provide a signal $t_f$ after the count of 1023 clock pulses CLK, which signal corresponds to the last bit position of the long shift registers LR. The decoder 45 of timing counter 40 also provides a signal $t_c$ which is repeated every four clock pulse periods to indicate the last bit position of a character period, a signal $t_d$ which is repeated every eight clock pulse periods to indicate the last bit position of a double-character period, and a signal $t_e$ which is repeated every 128 clock pulse periods to indicate the last bit position of the recirculating cycle of the short shift registers SR.

The data processor includes an instruction register 42 comprised of the four-bit M register and a four-bit 0 register. As will be made clear, infra, the M register is provided with an address which is usually used for the addressing of one of the short shift registers SR, and the 0 register stores one of the orders which is to be performed on the data in the selected short register SR during an execution cycle of the data processor. It should be noted that the address in the M register is immediately loaded into an N counter for all orders except the order Memex 08.

The data processor is provided with an instruction address register 46 comprised of a four-bit I counter and a four-bit J counter. This register 46 stores the location of one of the short shift registers SR in the working memory 10 in which the next instruction to be carried out is being stored. The I counter thus serves to select one of the short shift registers SR and the J counter serves to select a particular character-pair position in the selected short shift register SR.

The data processor is divided into operating cycles commensurate with the periods of recycling of the short shift registers SR, and each operating cycle may thus be designated as an S-cycle. Thus, an S-cycle of the processor is 128 bits long and is defined by successive signals $t_e$ from the timing counter 40.

The operation of the data processor is divided into a nonexecute S-cycle which is usually followed by a single execute S-sycle, although, as will be described, infra, a few of the orders, such as the orders Fill 00, Multiply 09, and Memex 08, provide for the nonexecute S-cycle to be followed by a plurality of successive execute S-cycles. An Ef flipflop is provided for distinguishing a nonexecute S-cycle from an execute S-cycle. When the E flipflop is reset so that its output E is at a high logical level, the data processor is in a nonexecute S-cycle, and when the E flipflop is set so that its output E is at a high logical level, the data processor is in an execute S-cycle. During an E S-cycle, all of the SR registers, including the selected one, recirculate their contents without change. During an E S-cycle, a new content may be fed into the selected SR. The contents of the unselected SR registers and the LR registers, as well, recirculate unchanged except during the execution of the order Memex 08 when half the SR registers and one of the LR registers are exchanged.

During the operation of the data processor, assuming that program instructions and data have already been placed into the registers SR of the working memory 10, the first operation to be performed is the filling of the instruction register 42 with information from the working memory 10 by use of the instruction register 46 which holds the four-bit hexadecimal digit $i$ in the I counter and the four-bit hexadecimal digit $j$ in the J counter. Thus, during a nonexecute S-cycle, as indicated by the E flipflop being in its reset state, the I counter output is sensed by the register selector 21 to cause the output selector 12 and the input selector 14 of the working memory 10 to select one of the short shift registers SR as the source of the instruction. This results in the data being recirculated in the selected short shift register SR to be stepped to the S data out line 19. This line 19 is connected by connection 27 to the input of the our-bit M register whose output is connected to the input of the four-bit 0 register. As the data is being serially stepped through the M and 0 registers, the timing counter output $t_a$ which corresponds to timing flipflops T3 to T6, inclusive, is compared in a comparator network 48 with the output $j$ of the J counter. As previously discussed, $j$ corresponds to one of the 16 character pairs stored in the selected short shift register SR. Thus, when $j$ and $t_a$ correspond, a Z flipflop is set which results in the termination of the shifting of the S data via connection 27 through the M and 0 registers. The information which corresponds to the selected character pair left in the M and 0 registers is the address and order of the instruction. The character in the M register is immediately loaded into the N counter for all orders except the order, Memex 08. Thus, at the end of the nonexecute S-cycle, the E flipflop is set to enable the execute S-cycle to be carried out.

As will be explained, infra, at the same time that the shifting of data in the M and 0 registers is terminated, the J counter, and, if necessary, the I counter, are incremented for use in defining the location in the working memory 10 of the next instruction during the next nonexecute S-cycle.

During an execute S-cycle, the N counter functions through the register selector 21 to set the output selector 12 and input selector 13 of the working memory 10 to select a given one of the short shift registers SR. Likewise, the 0 register content is decoded by decoder 43 to energize one of the order outputs 00 to 015, inclusive, which, as will be described, infra, renders operable a portion of the S' logic network 18 as well as portions of other logic networks, as required, to modify the data in the selected short shift register SR.

It should be noted that the present data processor provides sixteen simple, basic, built-in orders 00 to 015, inclusive, for performing on the data stored in the SR registers of the working memory 10. The orders are performed in accordance with a program comprising a sequence of instructions designed by the user of the processor. Each instruction is comprised of an order code and an address of one of the SR registers whose contents is to be operated upon in accordance with the order code. Generally, the processor provides orders for being able to modify the data on a bit-by-bit basis by use of a B flipflop. Thus, the B flipflop can be inserted in the recirculating path of the selected short shift register SR or the short shift register A to shift or precess data therein by one bit position. The B flipflop is also used to provide the carry for add or the borrow for substract. The processor also provides orders for being able to modify data on a digit-by-digit basis by use of a C register. Thus, the four-bit C register can be inserted in the recirculating path of the selected short shift register SR to shift or precess the data by a character or digit position. The C register is also used to store the multiplier to determine the number of times the selector short shift register SR should be added to the short shift register A to perform multiplication. Furthermore, the C register is used for receiving input data from a card as read by an optical mark card reader 50 or for feeding output data to a printer 51. It should be noted that the processor provides for handling data on a word-by-word basis by defining the capacity of each of the short shift registers SR and A as the length of a word.

Having generally described the operation of the data processor as shown by the overall block diagram of FIG. 1, a more detailed description will next be presented of the timing counter 40.

TIMING COUNTER

Figure 2:
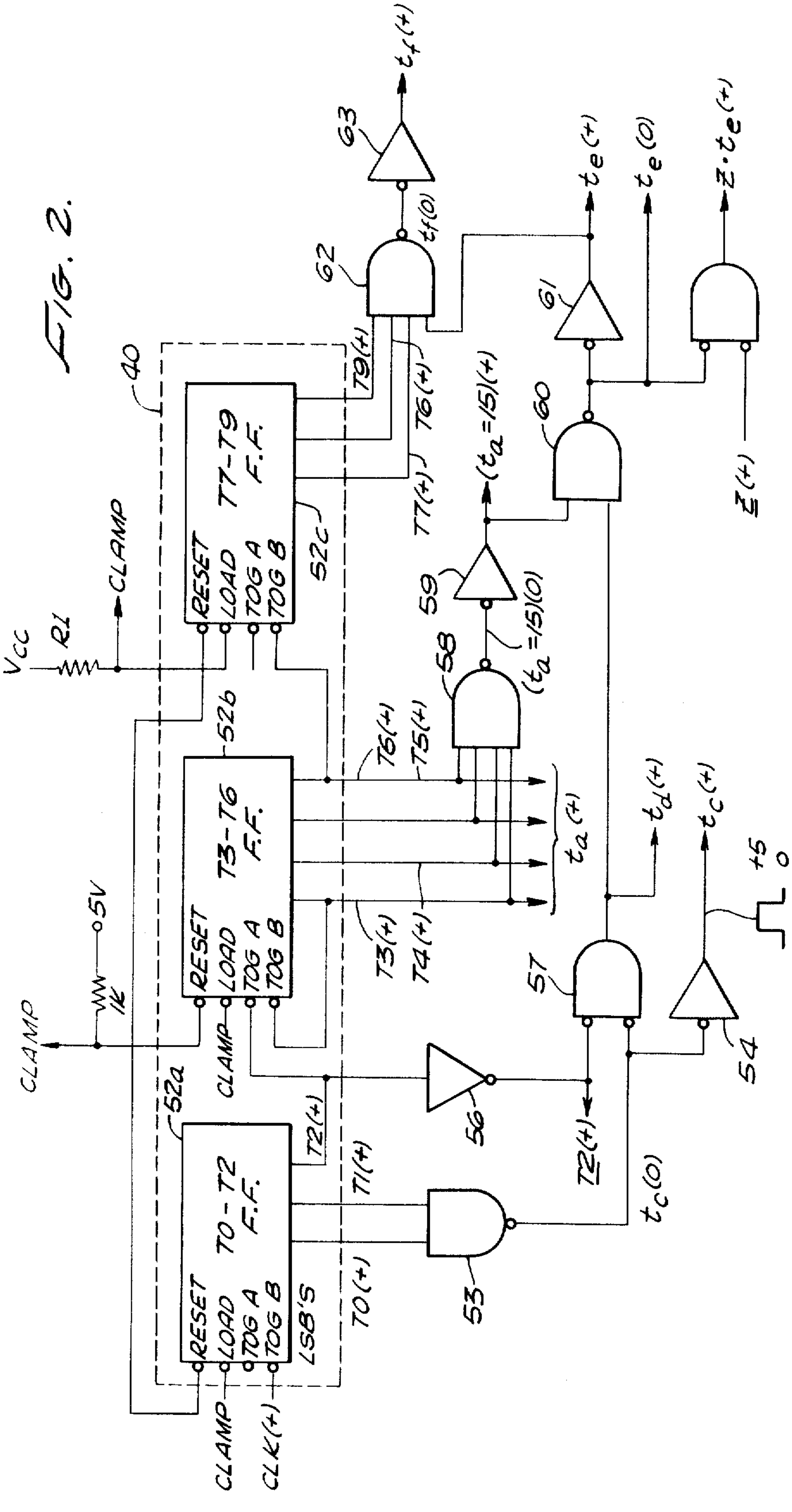
FIG. 2 is a schematic diagram of the timing counter together with an electrical circuit diagram of the decoding network therefor.

The timing counter 40 is a counting register comprised of ten flipflops T0 – T9, inclusive, which respond to clock signals CLK(+) to count "bit" periods during the normal course of events. As shown in FIG. 2, three integrated circuit packages **52*a*, 52*b*, and 52*c* are used to form the timing counter 40 with three of the flipflops designated T0, T1, and T2 provided in the first package 52*a*, four of the flipflops designated T3, T4, T5, and T6 provided in the second package 52*b*, and three of the flipflops designated T7, T8, and T9 provided in the third package 52*c*.**

The clock signals CLK(+) from the oscillator and pulse-forming circuit 44 are connected to the input (TOG B) of the first package **52*a*; the flipflop output T2(+) of the first package 52*a* is connected to the input (TOG A) of the second package 52*b*; and the flipflop output T6(+) of the second package 52*c* is connected to the input (TOG B) of the third package 52*c*.**

The flipflop outputs TO(+) and T1(+) are combined in a nand gate 53 whose output upon being inverted in inverter 54 provides the signal $t_c(+)$ which, when at a high logical potential level, is indicative of the last bit position of one of the 32 character periods during an S-cycle.

The flipflop output T2(+) is connected through an inverter 56 and combined in nand gate 57 with the output of nand gate 53 to provide the signal $t_d(+)$ which, when at a high logical potential level, is indicative of the last bit period of each of the 16 double-character periods of an S-cycle.

The flipflop outputs T3(+), T4(+), T5(+), and T6(+) represents a binary digit designated $t_a(+)$ which distinguishes the successive 16 double-character periods of an S-cycle. These four flipflop outputs are combined in nand gate 58 whose output upon being inverted in inverter 59 provides a signal ($t_a$=15) (+) which, when at a high logical potential level, is indicative of the last double-character period of an S-cycle.

The output ($t_a$=15) (+) is combined with $t_d(+)$ in nand gate 60 whose output is inverted in inverter 61 to provide a signal $t_e(+)$ which, when at a high logical potential level, is indicative of the last bit position of the S-cycle which consists of 128 bit periods. Likewise, the signal $t_e(+)$ is combined with signals T7(+), T8(+), and T9(+) in nand gate 62 whose output is inverted in inverter 63 to provide a signal $t_f(+)$ which, when at a high logical potential level, is indicative of the last bit position of the L-cycle which consists of 1,024 bit periods.

It should be noted that the counting operation of the timing counter 40 is advanced by one bit period on the falling (negative edge) of the input clock pulse CLK(+), and that usually all the short shift registers SR, the long shift registers LR, and the short shift register A synchronously advance their contents by one step in each bit period, i.e., approximately once per microsecond.

It should be noted in FIG. 2 that the term $t_e$ is generated in both the form of a signal $t_e(O)$ and a signal $t_e(+)$. At a given time these signal are always inverted relative to each other but which is of a high logical level (+5v.) and which is of a low logical level (0v). is dependent on the logical level of the signals or signal by which they are generated. The association of the (0) or (+) with each of the terms throughout the figures of the drawings thus denotes the source of the signal and also denotes which of the forms of the signal is used to activate the logical gating circuit to which it is connected.

WORKING MEMORY

Figure 3:
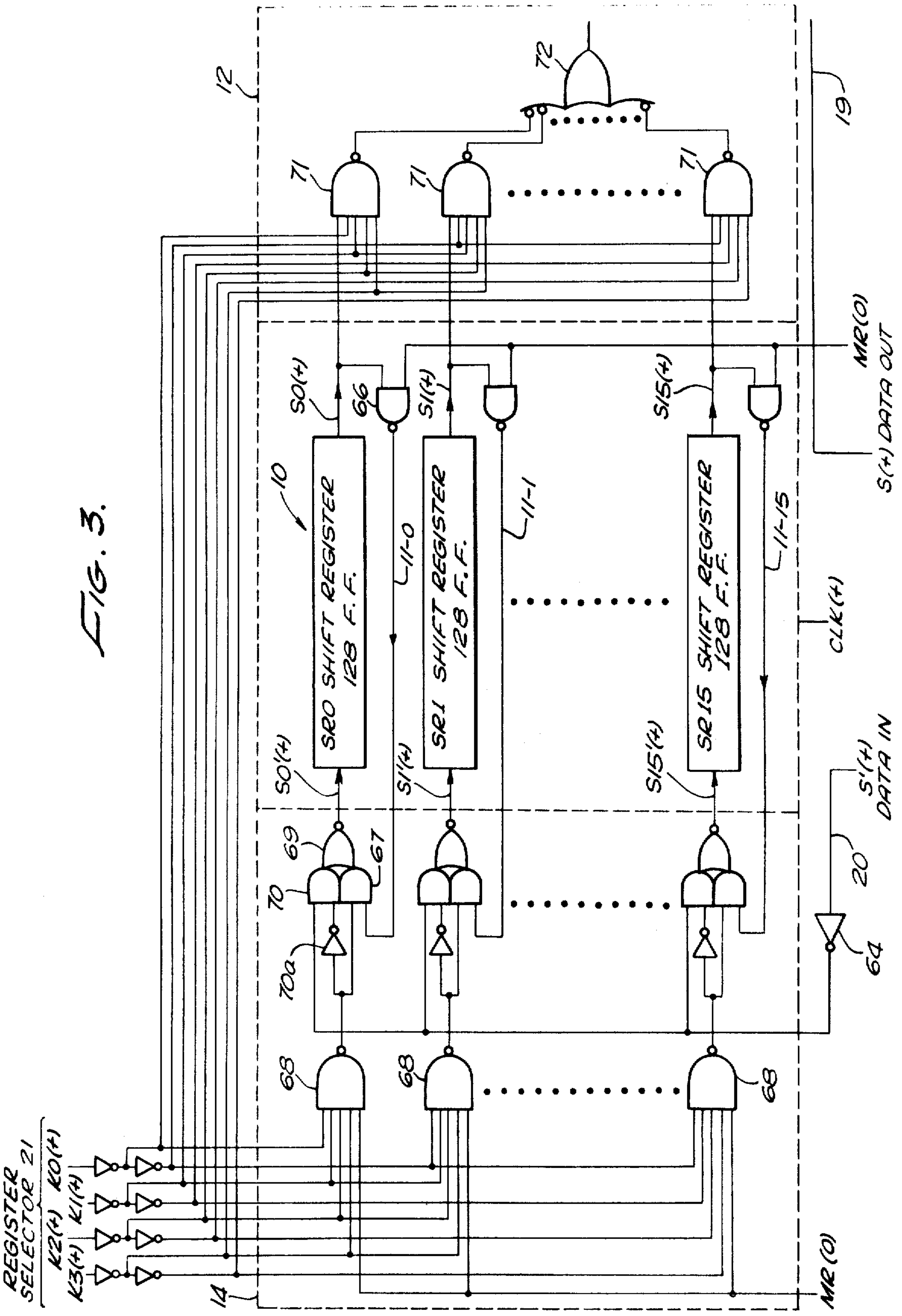
FIG. 3 is a schematic and electrical circuit diagram of the working memory.

A more detailed description of the working memory 10, as shown in FIG. 3, will next be presented. As indicated, each of the short shift registers SR0, SR1, . . . SR15 comprises 128 flipflops, and each provides for normally recirculating its contents by connecting its output to its input. As previously described in connection with FIG. 1, the working memory 10 is provided with an output selector 12 and an input selector 14 which are both set by signals from register selector 21 to select one of the short shift registers SR to route its data through the S' logic network 18 wherein it can be changed.

Thus, as shown for the short shift register SRO, its output designated SO(+) is connected to one input of a nand gate 66 whose output is connected by recirculating path 11–0 to one input of a nand gate 67 included in the input selector 14. The other input of nand gate 66 is connected to receive a signal MR(O) (FIG. 18) which is normally at a high logical potential level so as to enable the output SO(+) of the short shift register SRO to pass therethrough. Likewise, the other input of nand gate 67 is connected to receive the output of a nand gate 68 in input selector 14 which output is at a high logical potential level when the register SRO is not selected by the register selector 21. It is thus seen that when the short shift register SRO is not selected, the output of nand gate 67 passes through the nor gate 69 to the input SO'(+) of the short shift register SRO so that its data is recirculated therein via recirculate line 11–0 without change. In a similar manner each of the other SR short shift registers of the working memory 10 provides for synchronously and steadily shifting and recirculating its data without change if the register is not selected by the output selector 12 and the input selector 14.

As shown in FIG. 3, the output selector 12 includes a nand gate 68 associated with each of the SR registers, and the input selector 14 includes a nand gate 71 associated with each of the SR registers. The nand gates 68 and 71 are set by the hexadecimal character address in the address selector 21 to select one of the short shift registers SR. Thus, identifying signals on lines K0(+), K1(+), K2(+), and K3(+) from register selector 21, together with their inverted forms of the signals, are applied onto the respective nand gates 68 of the output selector 12 and the respective nand gates 71 of the input selector 14. Each of the nand gates 68 is connected to receive a signal MR(0) which is normally at a high logical level so as to enable the output of the selected nand gate 68 to be inverted when selected. The nand gate 71 of the output selector 12 associated with the SR0 shift register provides for gating output S0(+) through to the nor gate 72 whose output is the S(+) data out line 19. Thus, when the register selector 21 provides for storing an "address" corresponding to the SR0 short shift register, namely, 0000, the nand gate 71 in the output selector 12 which is associated therewith receives high level logical signals which gate the output S0(+) to the S(+) data out line 19. The register selector 21 also provides for enabling the nand gate 68 in the input selector 14 which is associated with the SR0 short shift register to receive high level logical signals which inverts the signal on its output and thus reverses the logical level signals on the associated nand gates 67 and 70 and thus provides for the selected SR0 short shift register to receive its input from the S'(+) data in line 20 rather than from its recirculate line 11–0.

BULK MEMORY

Figure 4:
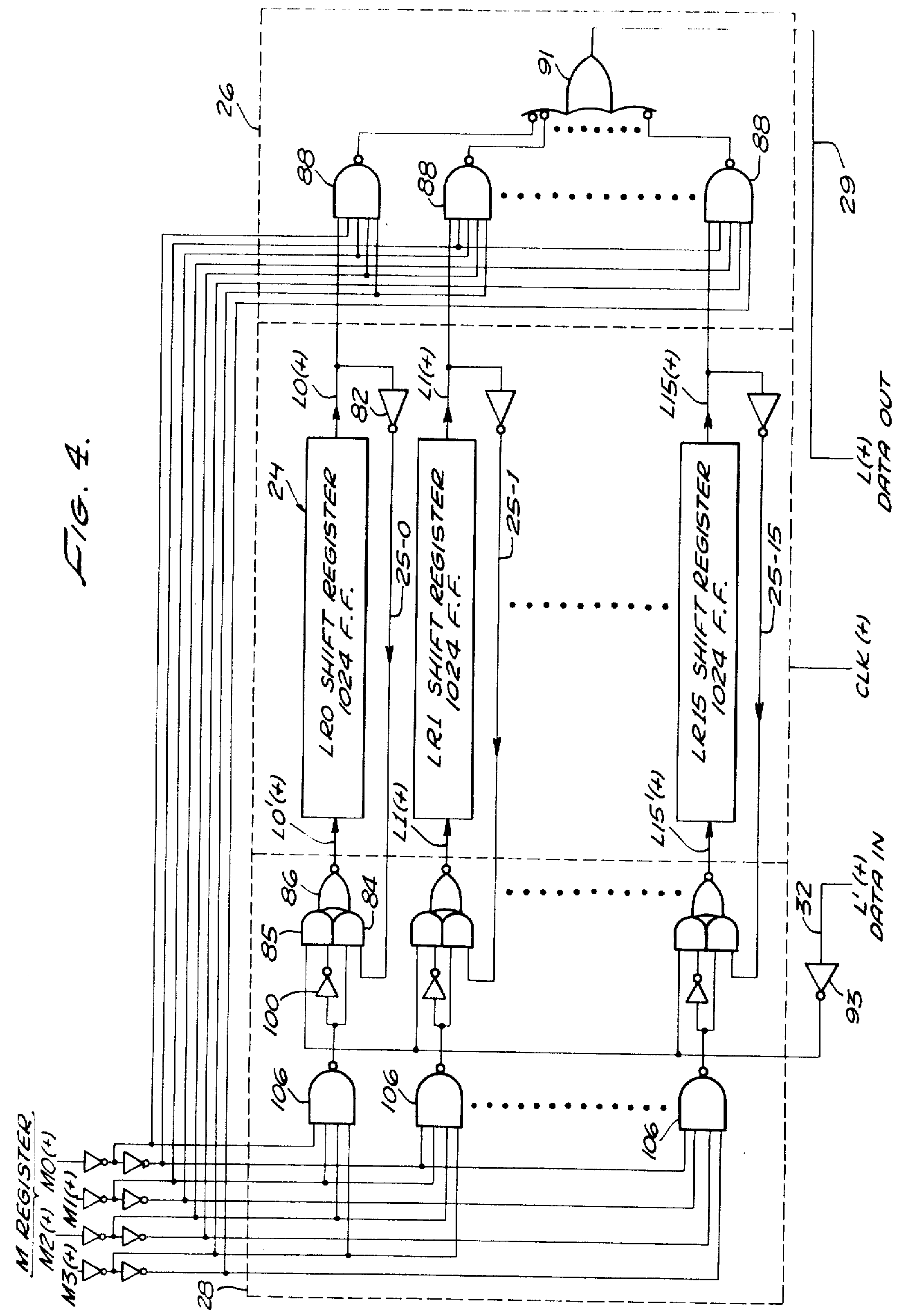
FIG. 4 is a schematic and electrical circuit diagram of the bulk memory.

The bulk memory as shown in FIG. 4 is arranged similarly to the working memory 10 in that each of the LR long shift registers comprised of 1024 flipflops provides for normally recirculating its content. Thus, as shown for the long shift register LR0, its output designated L0(+) is connected to inverter 82 whose output is connected by recirculating path 25–0 to one input of a nand gate 84 included in the output selector 26. The other input of nand gate 84 is conneted to receive the output of a nand gate 106 in input selector 28 that is associated with the LR0 register. The output of nand gate 106 is at a high logical level when the LR0 register is not selected so as to enable the output of nand gate 84 to be routed through nor gate 86 to the input L0'(+) of the LR0 register. Thus, when an LR register is not selected by register M, the data therein is recirculated. However, when an LR register is selected by the M register output signals M0(+), M1(+), M2(+), and M3(+) and their inverse signal forms, the output of the selected LR register is routed to the L(+) data out line 29, and the input of the selected LR long shift register is gated to receive data on the L'(+) data in line 32. Thus, as shown for the register LR0, when it is selected by the M register, the nand gate 88 of the output selector 26, which is associated with the LR0 register, passes the L0(+) output to the nor gate 91 whose output is connected to the L(+) data out line 29. Similarly, the output of nand gate 106 of input selector 26 is switched to a low logical level which cuts off the recirculation through nand gate 84 and enables the L'(+) data on line 32, upon being inverted in inverter 93, to pass through nand gate 85 and nor gate 86 to the L0'(+) input of the LR0 register. As shown in FIG. 1, the data on the L(+) data out line 29 is directed through the L logic network 30, where it can be modified in accordance with the order code set up in the 0 register and supplied on the L'(+) data in line 32 connected to the input of the selected LR long shift register.

A REGISTER

Figures 5, 6:
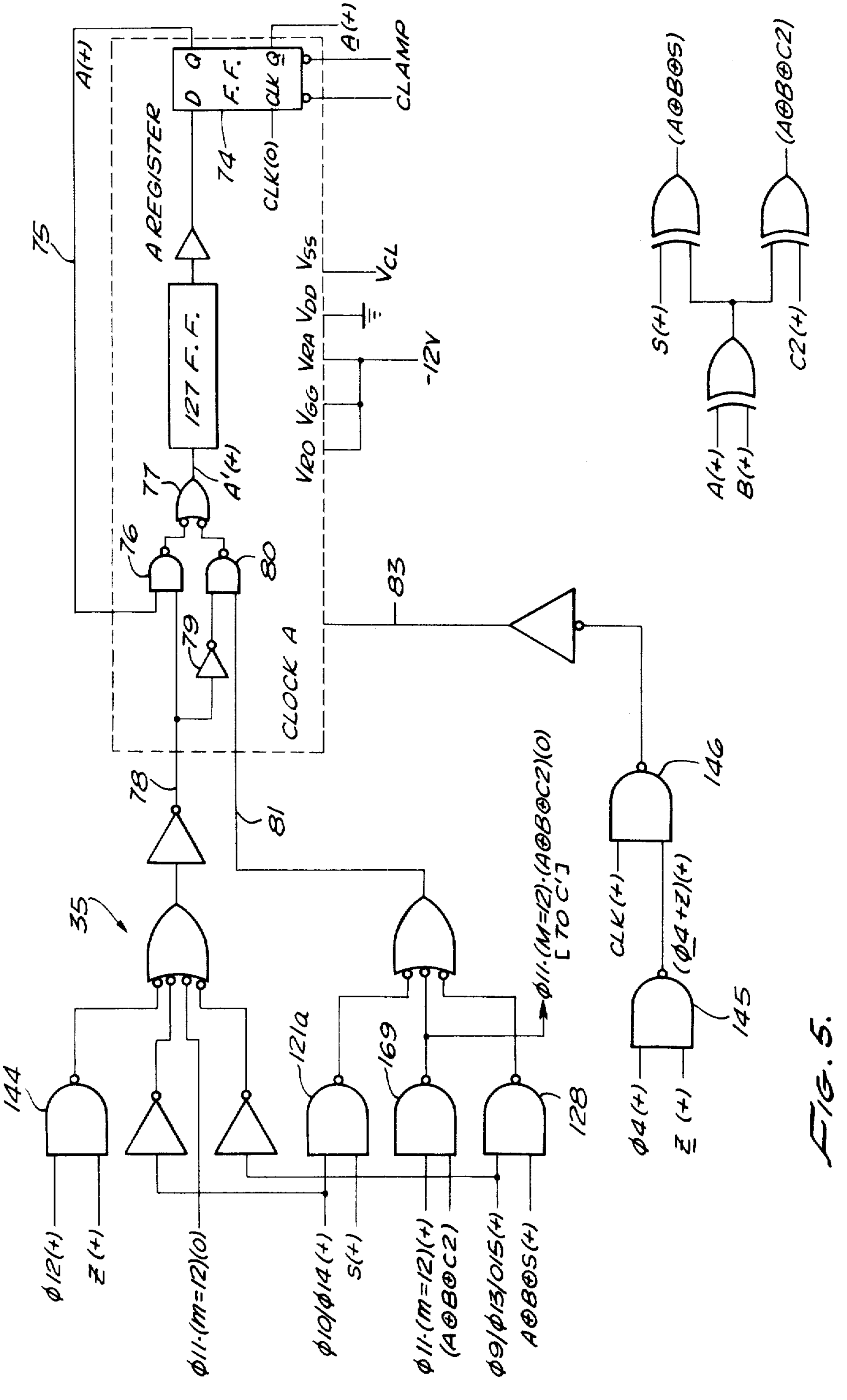
FIG. 5 is a schematic diagram of the A register and an electrical circuit diagram of the A' logic network associated therewith.
FIG. 6 is an electrical circuit diagram of the binary adder and substractor network.

A more detailed description of the accumulator register designated A, as shown in FIG. 5, will next be described. As previously mentioned, the A register is a short shift register which normally recirculates its information without change during each S-cycle. Thus, as shown, the output of the main portion of the A register which is 127 flipflops long is fed into a least significant bit flipflop 74. The A(+) output of flipflop 74 is fed via recirculate line 75 to the input of a nand gate 76 whose output is fed into a nor gate 77 and then as A'(+) into the most significant bit flipflop of the A register. The other input 78 of the nand gate 76 is normally high in logical level to enable this recirculation. However, when the recirculation of the A register is to be suppressed so as to be able to change the content thereof, as required during the orders Exchange 010, Test-Effect 011($m$=12), Trim 012, and Bring 014, the signal on input 78 is switched to a low logical level which cuts off the recirculating of the data through nand gate 76. The input 78, upon being inverted in inverter 79, renders effective the nand gate 80 which gates a modified input on logic line 81 into the A register. As will be explained later herein, the clock input CLK(+) being fed on line 83 to advance the shifting of the A register is suppressed in accordance with the digit n in the N counter during the execution of the order Precess 04.

INSTRUCTION ADDRESS REGISTER

Figure 7:
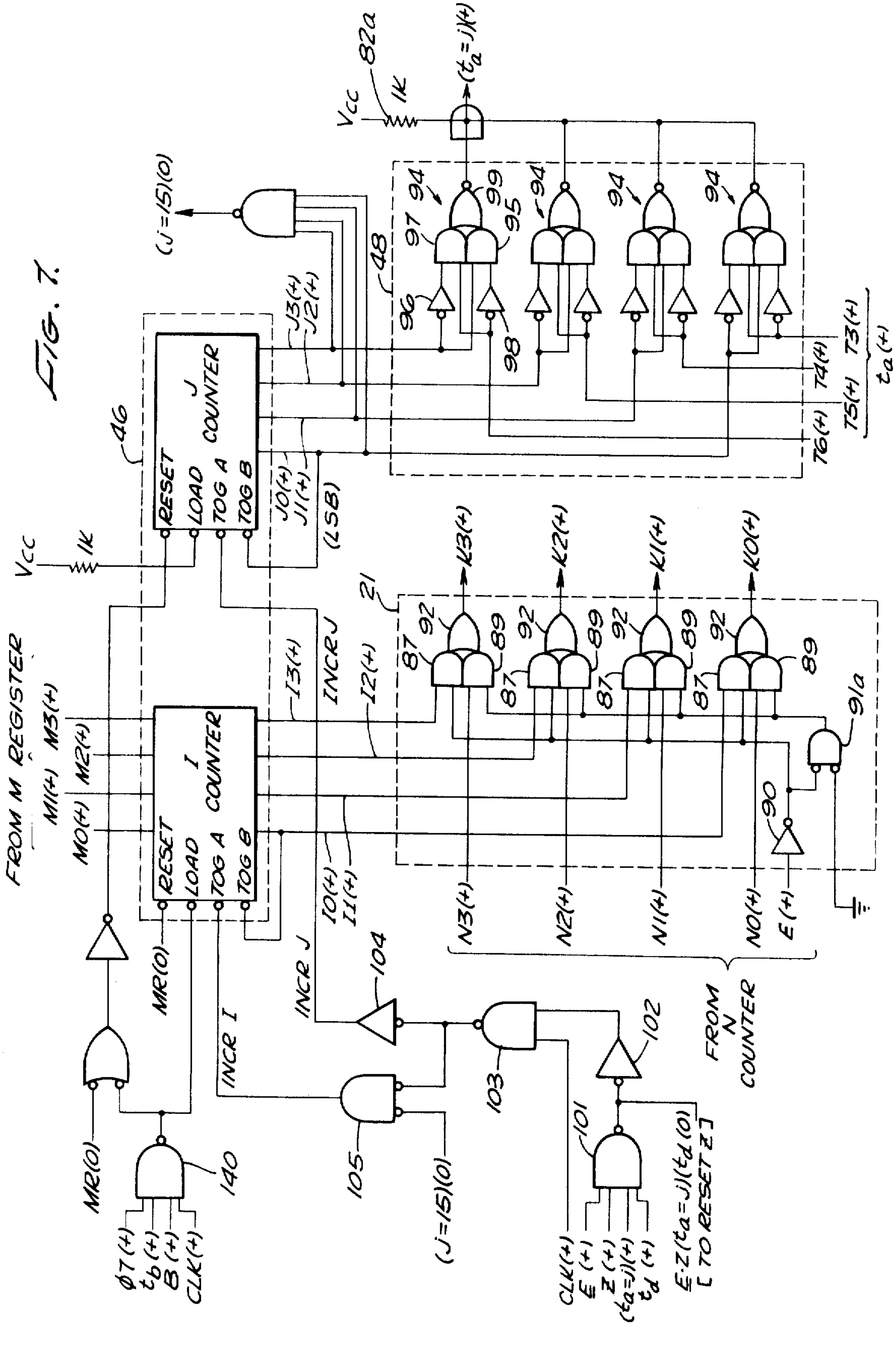
FIG. 7 is a schematic diagram of the instruction address register and an electrical circuit diagram of the register selector and timing comparator circuit associated therewith.

FIG. 7 shows the instruction address register 46 comprised of the I counter and the J counter. As previously discussed, the I counter stores the address of one of the SR registers in which the next instruction to be performed is stored and the J counter stores a digit corresponding to the particular double-character period in the selected register SR in which the instruction is stored.

The outputs I0(+), I1(+), I2(+), and I3(+) of the I counter are each connected to a respective nand gate 87 in the register selector 21 and the outputs N0(+), N1(+), N2(+), and N3(+) of the N counter (FIG. 8) are each connected to a respective nand gate 89 of the register selector 21. The E(+) signal from the E flipflop is connected by way of an inverter 90 to one input of each of the nand gates 87. The output of the inverter 90 is connected to one input of a nand gate 91*a*, the other input of which is grounded. Thus, when the E(+) signal is at a low logical level indicative of a nonexecute S-cycle, the nand gates 87 are enabled to pass the outputs of the I counter through the respective nor gates 92 to outputs K0(+), K1(+), K2(+), and K3(+). When the E(+) signal is high in potential indicative of an execute S-cycle of the processor, the nand gates 89 are controlled to supply the outputs of the N counter through nor gates 92 to the outputs K0(+), K1(+), K2(+), and K3(+).

During the nonexecute S-cycle, the signals from the register selector 21 select one of the SR registers and causes its content to be shifted through the M and 0 registers which comprise the instruction register 42. At the start of the nonexecute S-cycle the Z flipflop is set. Thus, the signal EZ(0) (as received at the input of the nor gate 74*a* in FIG. 8) is used to control the shifting of the information from the selected SR register in the M and 0 registers. Flipflop Z is reset at the end of one of the 16 double-character periods into which the S-cycle is divided. The last bit period of each double-character period is marked T0T1T2(+), or $t_d$(+). The 16 double-character periods are distinguished by the outputs of the flour flipflops T3 to T6, inclusive. The hexadecimal digit formed by these four bits is designated $t_a$. Flipflop Z is to be reset at the end of that double-character period in which $t_a$(+) agrees bit-by-bit with $j$(+), the ditit held in counter J. That agreement is briefly designated as ($t_a$=$j$) (+).

The J counter stores a digit which identifies the double-character period in the S-cycle of the selected register SR in which the instruction is stored. Thus, the outputs of the J counter, namely, J0(+), J1(+), J2(+), J3(+), are compared with the respective outputs T3(+), T4(+), T5(+), and T6(+) of the timing counter 40 in respective gating networks 94 provided in comparing network 48.

As shown for the gating network 94 of comparing network 48, which provides for comparing the J3(+) bit with the T6(+) bit, the J3(+) bit is directly connected to nand gate 95 and is connected by way of an inverter 96 to the nand gate 97, and the T6(+) bit is directly connected to nand gate 97 and is connected by way of an inverter 98 to the nand gate 95. When the J3(+) and T6(+) bits are both at the high logical level, or both at the low logical level, the outputs of both the nand gates 95 and 97 are at the low logical level, and the output of the nor gate 99 is at the high logical level. It should be noted that if the J3(+) and T6(+) bits are at different logical levels, the output of the nor gate 99 is at the low logical level causing current to flow in resistor 82a and the output ($t_a$=$j$) (+) to be at the low logical level, indicative of the lack of agreement. It should now be clear that output ($t_a$ =j) (+) is at the high logical level only when all the output bits of the J counter agree with the respective output bits of the timing counter 40.

Figures 10, 11:
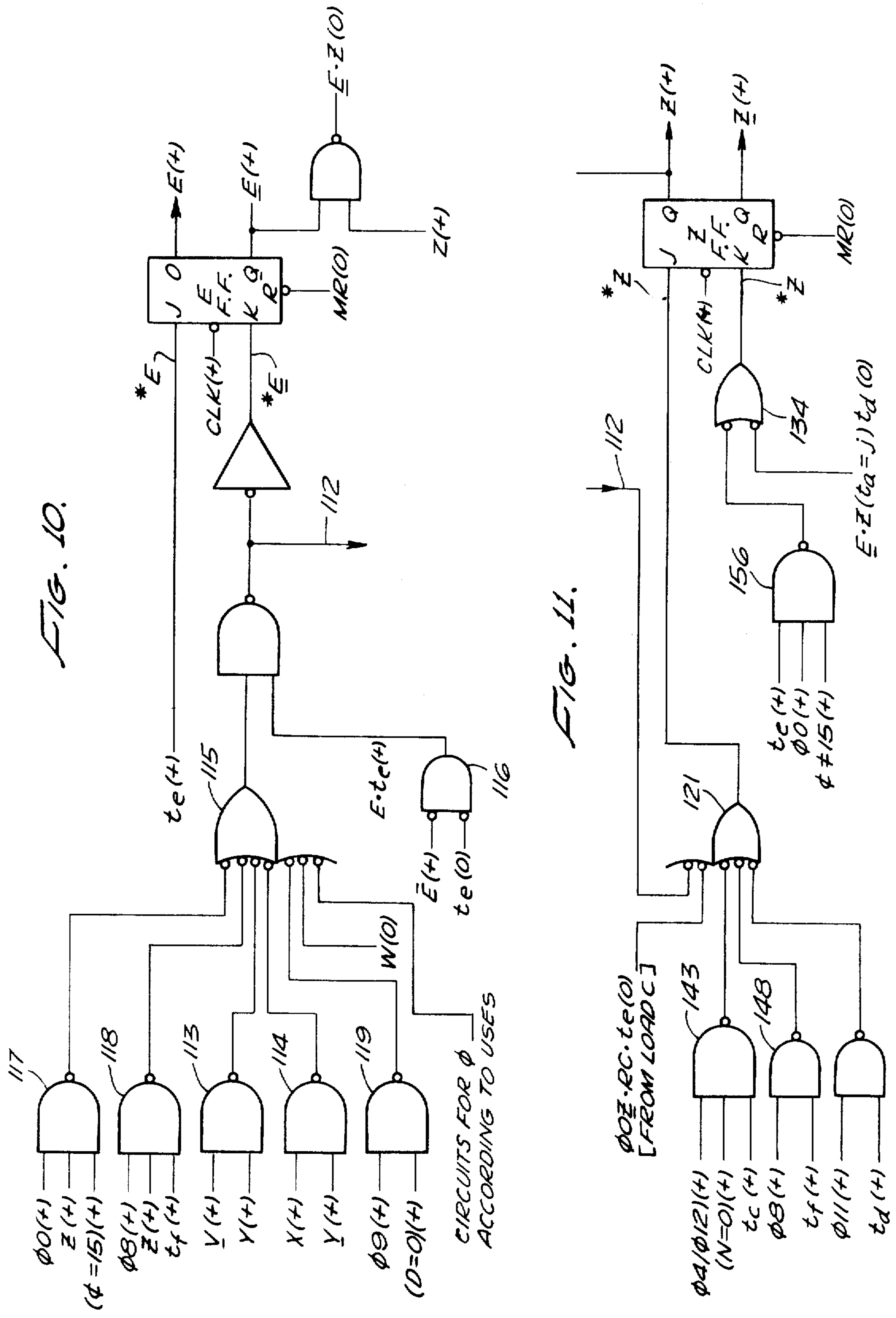
FIG. 10 is a schematic diagram of the E flipflop and an electrical circuit diagram of the input logic network therefor.
FIG. 11 is a schematic diagram of the Z flipflop and an electrical circuit diagram of the input logic network therefor.

In view of the above, it should now be understood that the resetting of the Z flipflop is described by *Z = $E\ Z\ t_d\ (t_a{=}j)\ (0)$ applied to the input of nor gate 134 in FIG. 11. As shown in FIG. 7 by the logic implemented by nand gate 101, the same signal used to reset flipflop Z is fed to an inverter 102 whose output enables a nand gate 103 to pass clock signals CLK(+) which upon being inverted in inverter 104 is fed as a high logical level signal to the (TOG A) input of the J counter which results in incrementing its cntent. When $j$ happens also to have the value 15, as indicated by nand gate 105, the output of nand gate 105 is further used to increment the I counter to the next address of the short shift register SR.

It should now be clear that the last four bits of S(+) before the resetting of Z, are held in the M register at the beginning (at least) of the succeeding E period and constitute the address portion of the instruction then to be executed. The next to last four-bit character thus shifted into the M register constitutes the order part of that instruction and is held in the 0 register throughout that succeeding E period. Any earlier bits shifted into the M and 0 registers as well as its prior content are lost on emerging from the 0 register.

INSTRUCTION REGISTER

Figure 8:
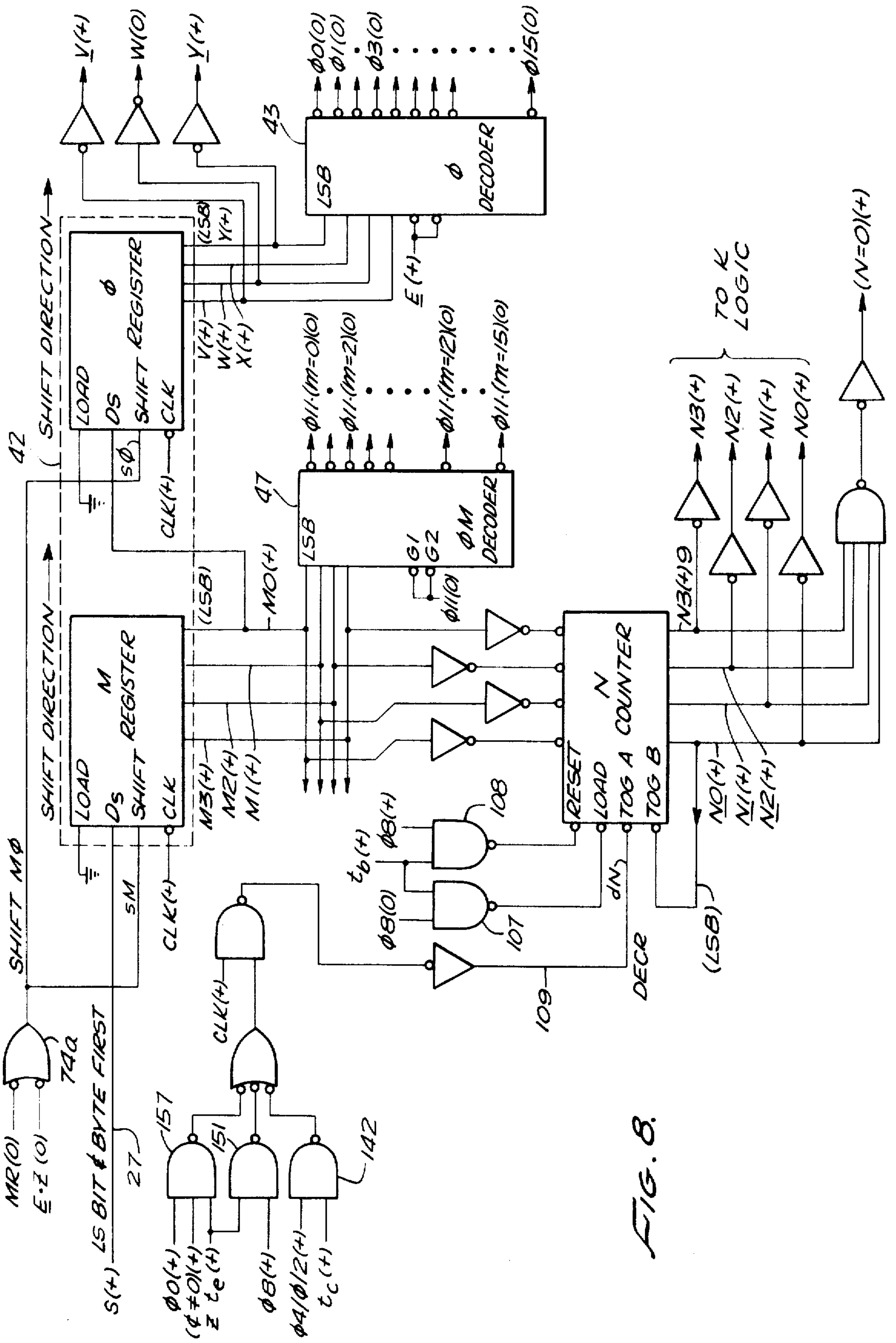
FIG. 8 is a schematic diagram of the instruction register, the N counter, and the order decoder and an electrical circuit diagram of the logic networks associated therewith.

FIG. 8 shows the instruction register 42 which includes the M register and the 0 register, each of which stores a four-bit hexadecimal character. As previously described, during the instruction read which is performed during the nonexecute S-cycle characterized by E(+), the output S(+) of the selected short register SR is fed into the Ds input of the M register, and the M0(+) output of the M register is connected to the D*s* input of the 0 register. The information on the S(+) data output line 27 is shifted bit-by-bit into the M register and into the 0 register for as long as the EZ(0) signal being fed into the nor gate 74*a* is low in logical level. Thus, as previously described, when ($j$=$t_a$) (+), the Z flipflop is reset and the shifting is terminated.

Figures 12, 13:
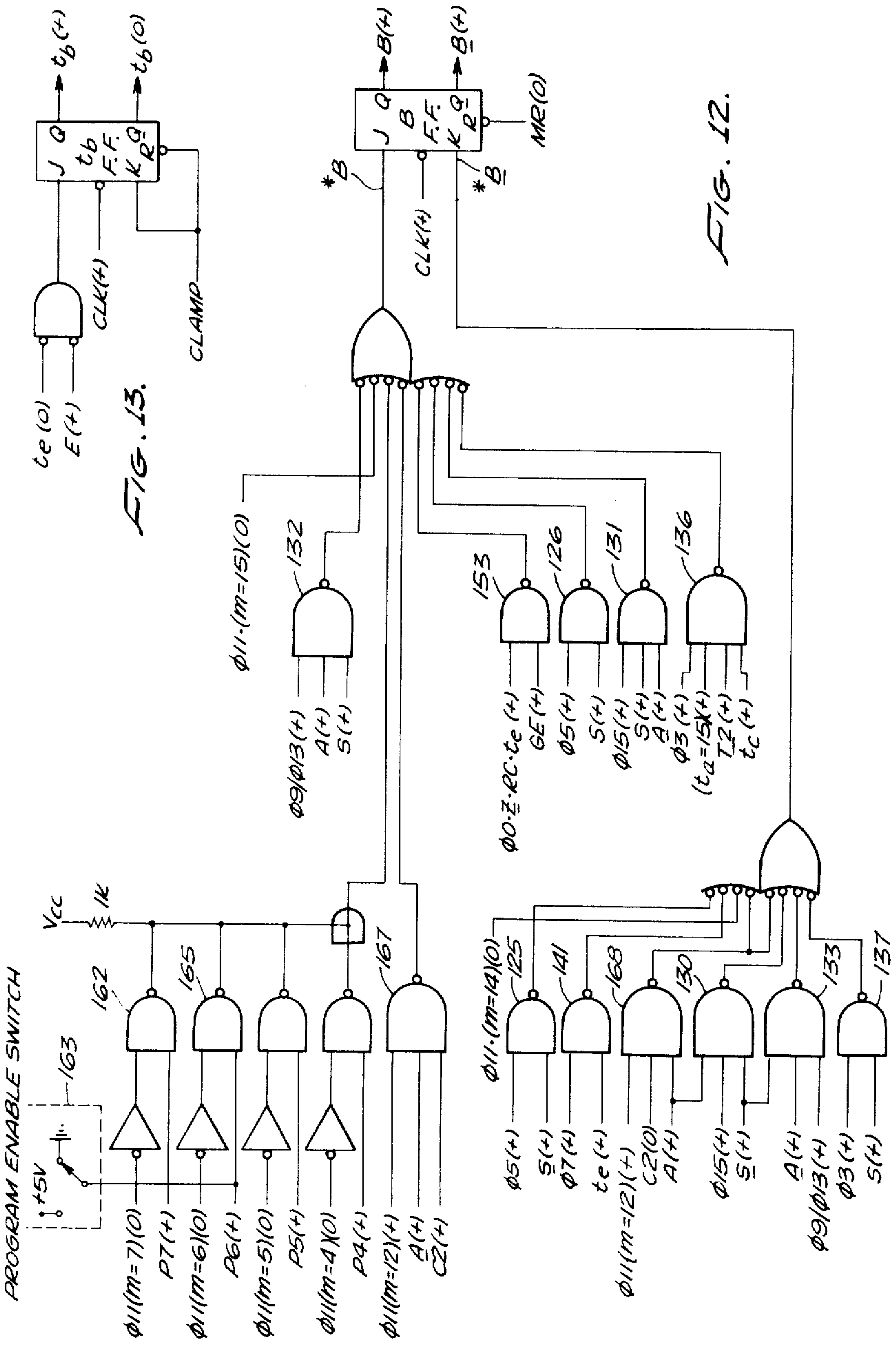
FIG. 12 is a schematic diagram of the B flipflop and an electrical circuit diagram of the input logic network therefor.
FIG. 13 is a schematic diagram of the $t_b$ timing signal flipflop.

As shown in FIG. 8, and as indicated by nand gate 107, the output of the M register is loaded into the N counter at all times except when the order Memex 08 is operable as indicated by the output 08(0) being at the high logical level. It should be noted that FIG. 17 provides for inverting the output forms of each of the order outputs 01(0), 03(0), etc., to provide the inverse forms 01(+), 03(+), etc. As indicated by nand gate 108, when the order Memex 08(+) is to be performed, the N counter is not loaded with the contents of the M register but rather is reset to zero in response to timing signal $t_b(+)$ which appears at the beginning of each execute period as shown in FIG. 13. As will be explained, infra, the N counter is immediately decremented by a signal on dN so as to start the Memex 08 operation with the address of the register SR15. As discussed in connection with FIG. 7, the outputs of the N counter are fed into the register selector 21 to perform the K logic.

At the beginning of the execution period, which is also the beginning of an S-cycle, the bits held in 0, i.e., in the V, W, X, and Y flipflops are the order code and determine largely the action to be taken in that E period. The order code in the 0 register can be any of sixteen combinations of four bits designated 0 and more explicitly represented by the states of its flipflops V, W, X, and Y. The order code 0 is decoded in the 0 decoder 43 to provide the signals 00, 01, 02, etc.,...015. When one of the 0 signals at the output of 0 decoder 43 is low in logical level, the 0 register is storing the order code corresponding thereto. Each 0 order code also has a name briefly descriptive of the action for use in prose discussion. For most orders 0 the content of the M register is loaded in the N counter and remains constant throughout the E period and serves to designate that one of the SR registers which is selected to take part in the activity. In the cases of the orders Precess 04, Trim 012, Fill 00, and Memex 08, n is used as a number and takes part in a decrementing process, as evidenced by a high logical level on line 109 connected to (TOG A) input of the N counter to determine the extent of the activity, rather than being used as an address. For the orders Fill 00 and Memex 08, *m* or *n*, as it is designated when in the N counter, is used in both ways, and for the order Test-Effect 011 m does not act either as an address or as a number but merely as a subscript of the order code 011. A 0M decoder 47 responds to the 011 order code stored in the 0 register and in combination with the number in the M register defines 16 distinct "no address" orders.

C REGISTER

Figure 9:
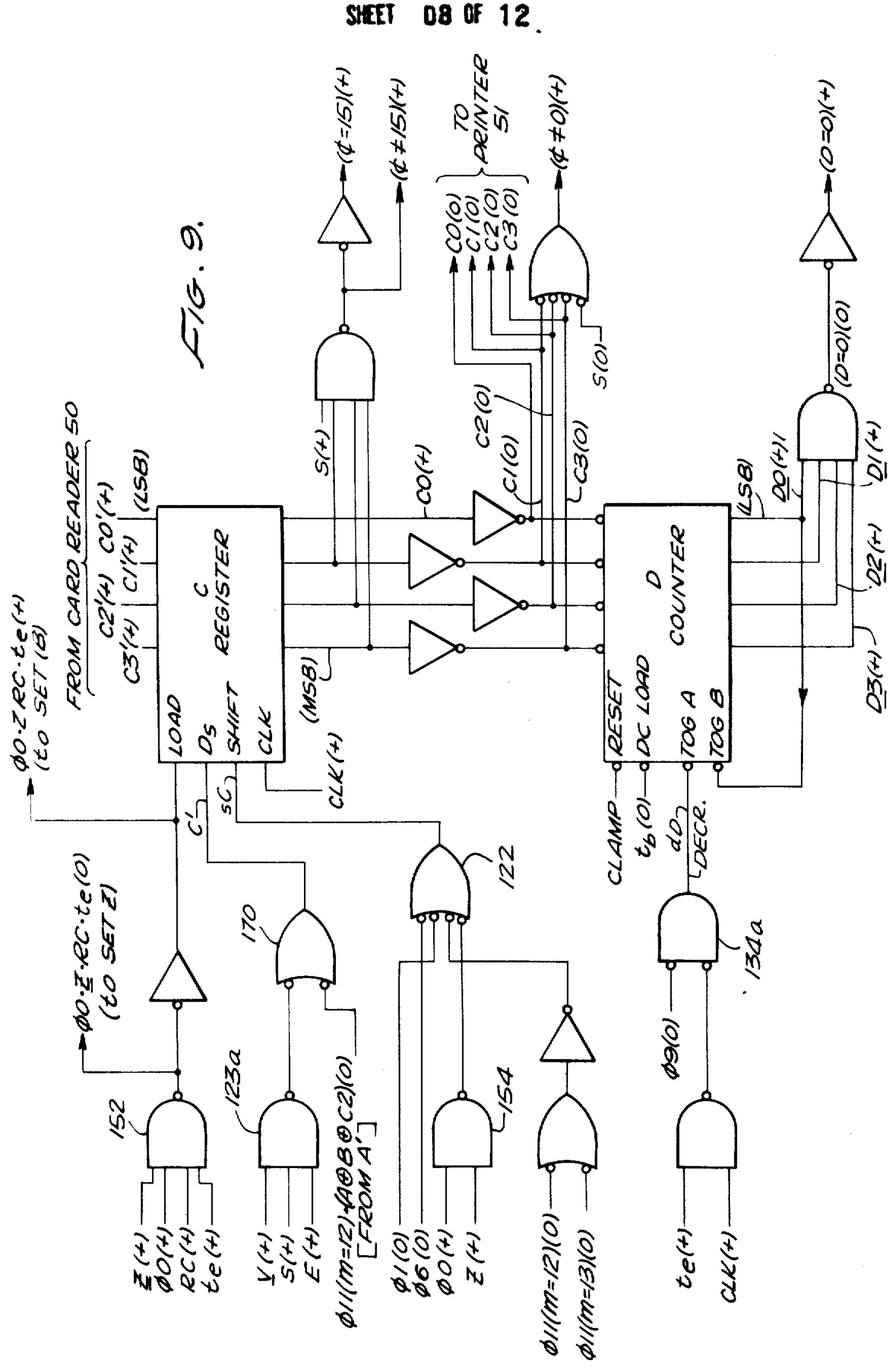
FIG. 9 is a schematic diagram of the C register and D counter and an electrical circuit diagram of the logic networks associated therewith.

As shown in FIG. 9, four flipflops C0, C1, C2, and C3 connected so as to function as a shift register form the C register. A second four flipflops D0, D1, D2, and D3 connected to function as a counter form the D counter. The D counter is loaded with the content of the C register at all times at which the $t_b$ timing signal is present. The D counter counts downward during the order Multiply 09 when the line *d*D to the (TOG A) input is at a high logical level.

The C register takes part in the operation of receiving information from the optical mark card reader 50, for example, for filling the working memory registers SR. In reading data into the system the four flipflops C0, C1, C2, and C3 are set. At a later time during the execution of the order Fill 00, the newly received character held in C register is shifted into the selected one of the SR registers. The times at which the C register shifts are determined by line connected to the shift input receiving a high logical level signal sC. The bit emerging from the C register which is routed into the selected SR short shift register is the bit held in C0.

Furthermore, the C register is used for feeding information from the working memory registers SR to the printer 51. Thus, the processor may be programmed to set the C register with the successive digits of a selected SR register. The outputs C0(+), C1(+), C2(+), and C3(+) of the C register are then made available to the printer 51.

Z FLIPFLOP

The Z flipflop is shown in FIG. 11 together with the logic network for controlling its *Z and *Z trigger inputs. At the beginning of each E period, the Z flipflop is reset. For most orders 0 the Z flipflop stays reset throughout the E period. For the four orders Fill 00, Precess 04, Trim 012, and Memex 08 the Z flipflop may be set at the end of the E period (if not sooner) and remains set during a part (or all) of the E S-cycle which follows. The line 112 connects the output of the nand gate 135 shown in FIG. 10 in the reset trigger network of the flipflop E to the nor gate 121 to assure that the Z flipflop is set at the end of the E period. Thereafter, in the time marked EZ(0), the content of the selected SR register which is to deliver the next instruction shifts its content into and through the instruction register 42. At an appropriate time during that E S-cycle, especially after J double character periods (here J is the less significant of the two hexadecimal digits constituting the instruction address which is stored in the J counter), the shifting of S through the instruction register 42 is terminated by the resetting of Z, which then remains reset into the succeeding E period.

For some orders the execution period is subdivided into two or more parts with the use of flipflop Z. (Flipflop Z may be regarded as ancillary to the V, W, X, and Y flipflops of the 0 register.) Thus, although at the beginning of each E period the Z flipflop is reset, for some orders it may later be turned on to distinguish a special phase of the activity.

The order codes and names are shown in the following Table I, and their effects briefly described.

TABLE I

| | | |
|---|---|---|
| 00 0000 | Fill | Data from card enters selected SR et seq. via C |
| 01 0001 | Rotate | Selected SR shifted through C. S' = C, C' = S |
| 02 0010 | Record | Content of A set into selected SR. S' = A |
| 03 0011 | Decrement | Decre. last character of selected SR with use of B |
| 04 0100 | Precess | Content of A shifted by 4*n* bits |
| 05 0101 | Double | Selected SR shifted through B. S' = B, B' = S |
| 06 0110 | Copy | Last character of selected SR copied into C. C' = S |
| 07 0111 | Jump | Next instr. from beginning of selected SR if B = 0 |
| 08 1000 | Memex | Half of Sr's exchanged with one LR |
| 09 1001 | Multiply | S added to A repeatedly |
| 010 1010 | Exchange | A exchanged with selected SR. S' = A, A' = S |
| 011 1011 | Test-Effect | Various no-address orders |
| 012 1100 | Trim | Clears A (i.e., A' = 0) after 4*n* bits |
| 013 1101 | Add | Selected SR added to A with use of B |
| 014 1110 | Bring | Selected SR copied into A. A' = S |
| 015 1111 | Subtract | Selected SR subtracted from A with use of B |

Duration of E Period

The E flipflop and the logical network therefor is shown in FIG. 10. The E period lasts for an integral number of S-cycles, in most cases for just one. The orders which terminate after a single S-cycle includes all those whose order codes satisfy the inputs of the nand gates 113 and 114 or the W(0) input to the nor gate 115 which conditions are all included in the reset input *E of the E flipflop. The termination of the E period is conditional upon the factor $Et_e$ provided by gate 116. The resetting of *E* for Test/Effect orders is not shown explicitly in FIG. 10. Since the *E* period lasts for one S-cycle, the setting of flipflop E is completely described by $*E = t_e$.

Record 02, Exchange 010 and Bring 014

Figure 14:
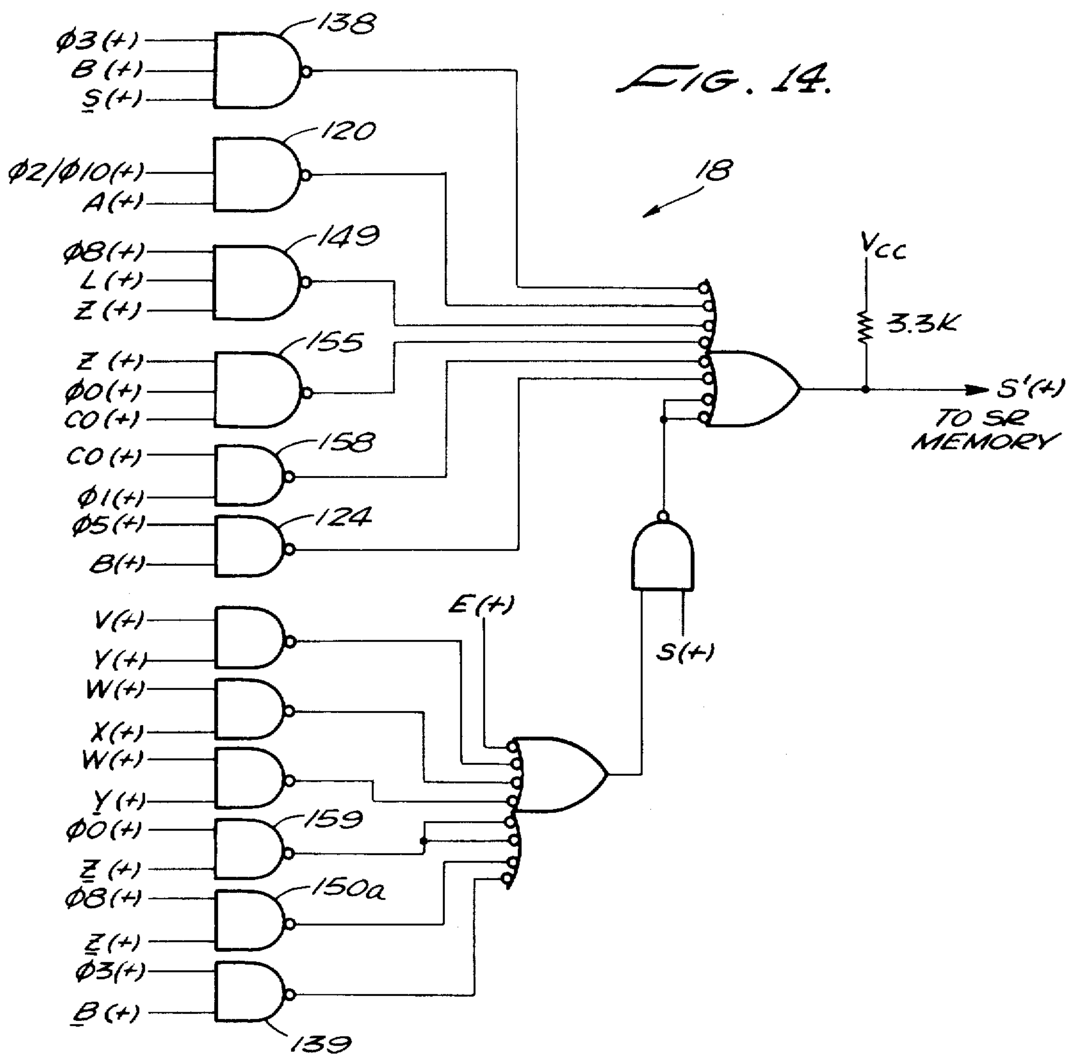
FIG. 14 is an electrical circuit diagram of the S' logic network.

These three orders will be described together since they relate to information transfers involving the selected SR. Each of these orders is executed during a single S-cycle. The order Record 02 serves to transfer the content of register A into the selected SR. The order Bring 014 does the opposite, transferring the content of the selected SR into the A register. The order Exchange 010 does both of these things, interchanging the contents of A and the selected SR. These activities are described by $S' = A$ during 02 and 010 as implemented by nand gate 120 in FIG. 14, and $A' = S$ during 010 and 014 as implemented by nand gate **121*a* in FIG. 5.** These transfer activities occur throughout the single S-cycle of duration of the E period, before the resetting of E for the reading of a new instruction.

Copy 06 and Rotate 01

In the execution of the order Copy 06, bits of the selected register SR of the working memory are shifted into and through the C register. The result is to leave in the C register at the end of the E period a copy of the last (most significant) digit of the content of the selected SR register, which content is otherwise unaffected.

In the execution of the order Rotate 01, also of duration one S-cycle, the selected register SR not only delivers its content for shifting through the C register but receives as its new content the output of the C register. The effect is to leave in the C register the most significant digit of the prior content of the selected SR register, just as for Copy 06, and to advance each other digit to the next most significant (later) digit position with the prior content of the C register becoming the new least significant digit held in the selected SR register. For both of these orders, the shifting of the C register is indicated by $sC = 01$ or 06 as implemented by connecting the proper form of these signals to the input of nor gate 122 in FIG. 9; and the supplying of S to the input of the C register is indicated by $C' = V S E$ as implemented by the nand gate **123*a* in FIG. 9. The supply of signal C0 to the selected SR register during Rotate 01 is indicated by $S' = CO$ 01 as implemented by nand gate 158 of FIG. 14.**

Add 013, Subtract 015 and Multiply 09

The operations of Add 013, Subtract 015 and Multiply 09 make use of flipflop B, the "borrow-carry" flipflop. Its content represents a borrow for Subtract 015 and a carry for Add 013 and Multiply 09. In these three operations the content of the selected SR register is added to or subtracted from the content of the A register, and in each case the result is returned to the A register. Each bit of the result of an addition or subtraction in the straightforward binary representation is the sum (Mod 2) of the bits being presented by A and S (the two operands) and B (the borrow-carry bit). This will be described here as $(A \oplus B \oplus S)$. The symbol $\oplus$ indicates the "exclusive or," i.e., the sum (Mod 2). This logic is generated in the network of FIG. 6. The result bit is returned to the A register in each bit period during the execution of Add 013, Subtract 015 or Multiply 09 as described by $A' = (A \oplus B \oplus S)$ during 09/013/015 and implemented by nand gate 128 in FIG. 5.

The handling of flipflop B during the execution of Subtract 015 differs from that in Add 013 or Multiply 09. For Subtract 015 a borrow is initiated when 1 is subtracted from 0, extinguished when 0 is subtracted from 1. This is indicated by $*B = S\ A$ during 015 and $*B = S\ A$ during 015. These conditions are implemented by respective nand gates 130 and 131 of FIG. 12.

For Multiply 09 and Add 013 a carry is initiated by 1 + 1, extinguished by 0 + 0. This handling is described by $*B = A\ S$ during 013 and 09, and $*B = A\ S$ during 013 and 09. These conditions are implemented by respective nand gates 132 and 133 of FIG. 12. In other cases the prior state of flipflop B is continued.

During the execution of Multiply 09 the content of the D counter is decremented at the end of each S-cycle. This is described by $dD = 09\ t_e$ CLK and implemented by nand gate **134*a* of FIG. 9.** At the end of the S-cycle in which the content of the D counter is zero, the execution is terminated. This is described by $*E = E\ 09\ t_e\ (D=0)$ which is implemented by nand gate 119, nor gate 115, nand gate 116, and nand gate 135 of FIG. 10. The number of S-cycles of execution, and, therefore, the number of additions of the content of the selected SR register to the A register, performed during the E period, is thus one more than the digit held in the C register at the time of entry.

For the performance of a completely "ordinary" Add 013, Subtract 015, or Multiply 09, with only positive numbers involved, these numbers must be such that $B = 0$ at the end of each S-cycle of the E period (more precisely, in the first bit period of the succeeding S-cycle). That is, no carry or borrow may be carried out of each add or subtract process. Moreover, no carry or borrow must be brought into the first (or only) S-cycle of execution. Some of the orders Test-effect 011 provide means for ensuring that B has the desired value before the execution of these orders.

Decrement 03

The order Decrement 03 is semiarithmetic in that it modifies a number, namely, the last (most significant) digit held in the selected SR register by a subtraction of unity from it. To effect this subtraction B is set on for the last character period of the E period as described by $*B = 03\ t_e\ T2\ (t_a = 15)$ and implemented by nand gate 136 in FIG. 12. The flipflop B is reset on finding a one bit in the selected SR register as described by $*B = 03\ S$ and implemented by nand gate 137 in FIG. 12. For as long as B stays on, during E period, the bits presented by SR are complemented as described by $S' = S$ *during* 03 *B*, and $S' = S$ during 03 *b*. These conditions are implemented by respective nand gates 138 and 139 in FIG. 14. For an ordinary use of the order Decrement 03 it is presumed that $B = 0$ on entry to the E period so that the earlier digits of SR will remain undisturbed; that, however, is subject to the programmer's choice. Flipflop B will be left reset following the execution unless the final character (in ordinary use) had been zero, in which case it is left set.

Double 05

The order Double 05 inserts flipflop B in the recirculating path for the SR register for one cycle of the E period. Its effect is thus to delay by one bit period, i.e., to double the prior content of the selected SR register leaving its most significant bit in B. Double 05 may be used to "peel" off bits from a selected SR as needed for program control. Similarly, it may be used to insert bits, one by one, into the selected SR register for later use. It is described by $S' = 05$ which is implemented by nand gate 124 in FIG. 14, and by $*B = S$ 05, and $*B = S$ 05 which are implemented by respective nand gates 126 and 125 in FIG. 12.

Jump 07

The order Jump 07 serves, in part, as a test of the state of flipflop B, since it has an effect only if $1 = 0$. That effect is to change the state of the instruction address register, namely, the IJ registers, and hence to change the progression of instructions being executed: in brief, to switch the program. Specifically, zero is set into the J register and $m$ into the I register. This transfer is described by $m \longrightarrow I$; $O \longrightarrow J$ during 07 $t_b$ as implemented by nand gate 140 of FIG. 7. Also, in the execution of jump the flipflop B is to be reset as expressed by $*B = t_e$ 07 and implemented by nand gate 141 in FIG. 12.

The order Jump 07 introduces a branch in the program, depending on the state of flipflop B, which may have been modified by an earlier order Test-Effect 011 $m$. The accompanying four-bit afdress selectes one of the 16 SR*s* as the target of the jump if one is to be made (viz. on the condition $B = 0$). If this jump is made the succeeding instruction is that held in the first character pair of the indicated SR register.

Precess04 and Trim 012:

The orders Precess 04 and Trim 012 use the ability of the N counter which is equipped for decrementing. At the beginning of the E period of the order Trim 012 which has a duration of one S-cycle, flipflop Z is reset, as for other orders. Counter N is decremented at the end of each character period. At the end of any character period in which ($n = 0$), flipflop Z is set, and remains set for the remainder of the $E$ period. The input to the A register is zero following the setting of Z flipflop. Thus, the content of the A register is set to zero after n characters. In this way the S-cycle is divided into two parts, of lengths determined by the initial value of $n$, and distinguished by the state of flipflop Z. These statements hold also for the order Precess 04, and it is convenient to describe them together. The decrementation of N is described by $dN = 04/$012 $t_c$ and implemented by nand gate 142 of FIG. 8; and the setting of Z is described by $*Z = E$ 04/012 $t_c$ ($n = 0$) and implemented by nand gate 143 of FIG. 11.

The effect of the order Trim 012 is to suppress the input, but not the circulation of register A, after the setting of Z. This is described by $A' = 0$ during 012 Z and implemented by nand gate 144 of FIG. 5.

The order Precess 04 serves to suppress the delivery of clock pulses to register A during one of two parts of the E period, and thereby to block its recirculation for an integral number of character periods. The content of A is therefore shifted in phase with respect to the other registers and the timing counter 40. The clock pulse blockage is expressed by 04 Z as implemented by nand gate 145. When the inputs to nand gate 145 are at a high logical level, the output of nand gate 145 is at a low, blocking clock CLK from passing through nand gate 146.

Memex 08

Each LR register recirculates its content without change at all times except during the period of execution of the order Memex 08, and even then most of the LR registers do so. The address held in register M selects one of the LR registers in the same way as it does one of the SR registers (during E periods) however, $L' = L$ in almost all circumstances, and therefore the selected LR register also recirculates. The order Memex 08 serves to exchange contents between eight of the SRs, namely, SR15 to SR8 (counting downwardly) and the LR addressed by the M register.

Figure 15:
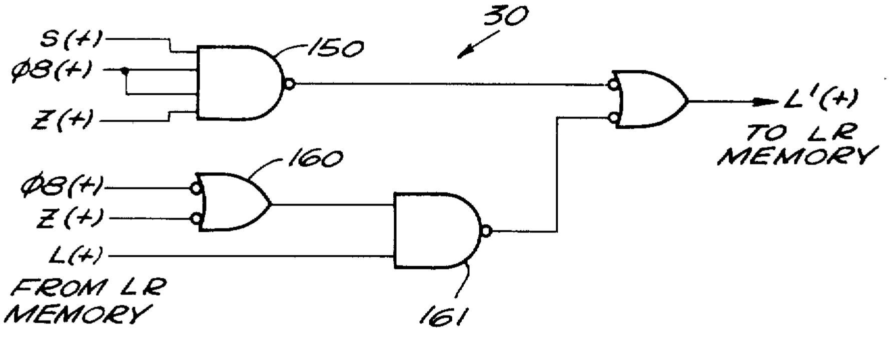
FIG. 15 is an electrical circuit diagram of the L' logic network.

At the time of entry into the E period, Z is off. It remains off, and the normal pattern of recirculation continues, until the first appearance of a signal $t_f$, which occurs once per L-cycle. Z is then set as indicated by $*Z = E$ 08 $t_f$ and implemented by nand gate 148 of FIG. 11. For the remainder of the E period, which is of one L-cycle duration, the exchange between the working memory and the bulk memory takes place as described by $S' = L$ during E 08 Z and $L' = S$ during E 08 Z. This logic is implemented by nand gate 149 (FIG. 14) and nand gate 150 (FIG. 15).

During this time the N counter is decremented after each S-cycle as indicated by $dN = 08$ Z $t_e$ and implemented by nand gate 151 of FIG. 8. On the next signal $t_f$ (which coincides with one of the signals $t_e$) the $E$ period is terminated, as shown by $*E = E$ 08 $Z$ $t_f$ and implemented by nand gate 118 of FIG. 10.

Fill 00

The order Fill 00 serves to permit the reception of information from outside the processor. Sensing devices of a card reader 50 are able to set the four flipflops of the C register during the E period of Fill 00. At some time after a digit has been thus placed in the C register there appears a "card clock" signal RC which authorizes the reception of that digit. That signal sets the Z flipflop at the beginning of an S-cycle if the parity of the bits check (circuit not shown) as represented by signal GE. The logic $*Z = E$ 00 $Z$ $RC$ $t_e$ is implemented by nand gate 152 in FIG. 9 and is combined with parity signal GE in nand gate 153 of FIG. 12.

During the active S-cycle following *Z the content of the selected SR register is shifted through the C register, just as in the E period of Rotate 0. This is shown by $sC = E$ 00 $Z$ implemented by nand gate 154 in FIG. 9, and $C' = V$ $S$ $E$ implemented by nand gate 123*a* of FIG. 9. The selected register SR receives the output of the C register as indicated by $S' = CO$ $Z$ 00 and implemented by nand gate 155 in FIG. 14 and $S' = S$ 00 $Z$ implemented by nand gate 159 of FIG. 14 (note these conditions serve to recirculate the selected SR register during Fill 00).

It is presumed that SR held only, or at least many, zero digits before the fill operation was started. It will therefore often happen that the digit left in C after this S-cycle is zero. In that event the Z flipflop is reset and the E period continues awaiting receipt of another d1git. During the last bit period of the active S-cycle, during $t_e$, the last digit has not yet been fully shifted into the C register, but its four bits may be observed in three of the C flipflops and S. That character so observed will be called ¢ . Thus, Z is to be reset if ¢ = 0. More generally, the Z flipflop is to be reset if ¢ has any value other than 15, as shown by $*Z = 00$ $t_e$ ( ¢ $\neq$ 15) which is implemented by nand gate 156 of FIG. 11.

The appearance in ¢ of any nonzero digit indicates that SR is full and produces a change in n as described by $dN = 00\ t_e\ (\not{c} \neq 0)$ which is implemented by nand gate 157 of FIG. 8.

The appearance of the value 15 terminates the $E$ period as shown by $*E = E\ 00\ \bar{Z}\ t_e\ (\not{c} = 15)$ and implemented by nand gates 117 amd 135 of FIG. 10. It should be noted that the decrementation of n in that situation does no harm.

The reader clock signal RC, as presented to the processor, must last for at least one S-cycle to ensure that $t_e$ will appear during its presentation. It must not however continue for as much as one S-cycle beyond the end of the active cycle. A signal E 00 Z, indicating the active cycle, may be used to quench signal RC.

On first activating the processor an "initializing signal" is to be provided by a manual master reset switch MRS, shown in FIG. 18, which clears to zero the contents of the I, J, C, D, M, N, and SR registers of the working memory and further resets all the flipflops E, Z, and B. For the duration of that signal the condition E 00 continues, i.e., an E period with the order Fill 00 held in the 0 register. Shortly after the end of that signal, the condition will be E 00 Z, i.e., an inactive part of the E period for the order Fill 00 (the initial fill). A long card or program strip (not shown) is then placed in the optical mark card reader 50, and a sequence of characters is shifted into the selected SRO register by way of the C register. Let it be assumed that the first nonzero character is also not 15. Then after 32 more characters have been entered, that "lead character" emerges into the C register and n decreases to 15. The succeeding character read from the card then becomes a new lead character. If it is not 15, then the succeeding 32 characters will fill SR15; the next will fill SR14; etc. After a desired number of SRs have been filled it will have been arranged (in the planning of the program strip) for the lead character to have become 15 and its emergence from one of the SRs brings the initial Fill 00 execution to an end. At this time $i$=0 and $j$=0, and the regular program performance commences at the beginning of SRO.

Later uses of the order Fill 00 under the control of the program first inserted or subsequently modified are the same as the initial order Fill 00 except that the SRs into which information is to be set need not begin with SRO, need not be initially empty, and therefore, need not receive exactly 32 new characters each, according to the programmer's choice.

Test-Effect 011 *m*

Sixteen Test-Effect orders (011($m$=0) to 011($m$=15), inclusive, are available in the processor of the present invention to control nonaddress operations which do not require singling out a particular one of the SR registers or LR registers. As shown in FIG. 8, the OM decoder 47 responds to the outputs MO(+), Ml(+), M2(+), and M3(+) of the M register along with the 011(0) signal from the 0 decoder 43 to render one of the Test-Effect orders 011($m$=0) to 011($m$=15), inclusive, effective. Which of these orders are used, and for what purpose, will presumably vary considerably from processor to processor. The present discussion is intended to be illustrative only.

Some of the Test-Effect orders serve to test "external" circumstances. Thus, as shown in FIG. 12, the Test-Effect order 011($m$=7) may serve to test the presence of a card in the card reader 50. If a card is present a high logical level signal is provided on a line P7 which is connected to the card reader 50. Thus, whenever the order 011($m$=7) is called for by the operational program, if the line P7 is high in logical level, the output of nand gate 162 (FIG. 13) is inverted to a low logical level which results in the B flipflop being set. Another example of a Test-Effect order serving to test an external circumstance is the order 011($m$=6). Thus, when it is desired to store a new part of the program, for example, in the working membory 10 of the processor, it is first necessary for the operator to close a program switch 163, shown in FIG. 12, by use of a key provided with the processor. Thus, in the course of the program when the order 011($m$=6) is called for, the nand gate 165 in FIG. 13 tests whether the program enable switch 163 has been closed, and, if so, serves to set the B flipflop. The programmer may provide for the utilization of this information by using an order, say Jump 07, which provides for switching the program sequence or not dependent upon the state of the B flipflop.

Some of the Test-Effect orders 011($m$=0)–011($m$=15), inclusive, serve to provide a signal for affecting equipment external to the processor, such as the order 011($m$=2), which is used to initiate a driver circuit shown in FIG. 19 to open a cash drawer (not shown). Thus, when the Test-Effect order 011($m$=2) is effective, a signal 011($m$=2) (0) applied to a logic network of a flipflop 173 gates a clock signal $CLK(+)$ at $t_e(+)$ time to set the flipflop 173. The high level output 174 of flipflop 173 applied to the nand gate 176 causes the transistor 177 to conduct and thereby open the cash drawer.

Another example of the utility of the Test-Effect orders is the order 011($m$=12) which serves to perform an arithmetic operation, namely, to shift the contents of register C, and subtract C2 from A. The difference is set into C and A. This can be described by $C' = (A \oplus B \oplus C2)$ 011 ($m$=12) which is implemented by nor gate 170 in FIG. 9, by $A' = (A \oplus B \oplus C2)$ 011($m$=12) which is implemented by nand gate 169 in FIG. 5, by $*B = A\ C2$ 011($m$=12) whihc is implemented by nand gate 167 in FIG. 12, and by $*B = A\ C2$ 011($m$=12) which is implemented by nand gate 168 in FIG. 12.

OPERATION

Figure 20:
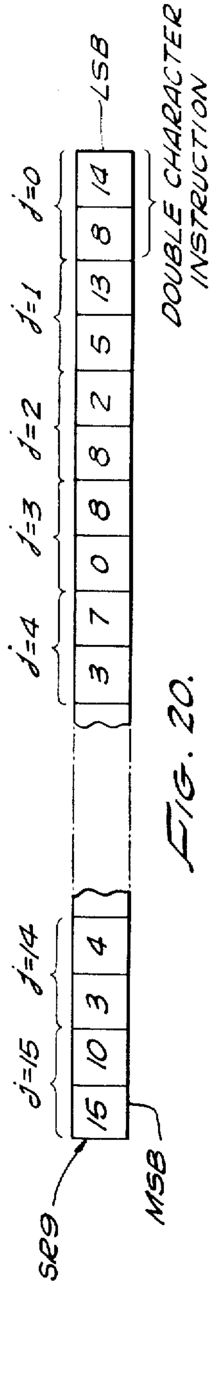
FIG. 20 illustrates one of the SR registers filled with a sequence of program instructions.

The operation of the processor of the present invention has been described to a great extent by the previous descriptions that have been presented of how the SR registers of the working memory 10 are initially filled with data sensed by the card reader 50 during the order Fill 00 how the instruction is read from a selected SR register of the working memory 10 during the E S-cycle, and how each of the order codes set up in the 0 register can be used to modify the data in an SR register selected by the N counter. Thus, it should be clear that some of the SR registers of the working memory 10 are loaded with as many as 16 two-character instructions ($m$,0), and other SR registers are loaded with data to be operated upon in accordance with the instructions. FIG. 20 is a diagrammatic showing of the SR9 register and illustrates how the two-character instructions may be stored in each of the double-character periods of the register. Thus, the order code (8,14) is indicated as being stored in the first double-character period identified by $j$=0, the order code (5,13) is indicated as being stored in the second double-character period identified by $j$=1; the order code (8,2) is indicated as being stored in the third double-character period identified by $j$=2; and the order code (0,8) is indicated as being stored in the fourth double-character period identified by $j$=3, etc.

The manner in which the instruction is read from the memory during the E S-cycle has been previously described in connection with FIG. 7. Thus, it should now be clear that initially the instruction address register 46 might store the character 9 in the I counter, indicative of the SR9 register, and store the character O in the J counter, indicative of the first double-character period of the SR9 register. Thus, during an E S-cycle, the instruction (8,14) is read from the SR9 register and stored in the instruction register 42, and the J counter is incremented to store the character 1. The E flipflop is set at the end of the E S-cycle. As a result of the instruction read operation, the character 14 stored in the 0 register enables the order Bring 014 to be effective and the character 8 in the M register, which is immediately loaded into the N counter, enables the N counter outputs to select the SR8 register in the working memory 10. The order Bring 014 acts to transfer the content of the SR8 register into the A register and is completed in one E S-cycle. Thus, during the next E S-cycle, the instruction (5,13) is read from the SR9 register resulting in the character 13 being placed in the 0 register to render the order Add 013 effective and the character 5 being placed in the N register to select the SR5 register. Also, the J counter is incremented to store the character 2. The E flipflop is set at the end of the E S-cycle. Thus, during the following E S-cycle, the contents of the SR5 register are added into the A register. During the next E S-cycle, the instruction (8,2) is read from the SR9 register resulting in the character 2 being placed in the 0 register to render the order Record 02 effective and the character 8 being placed in the N register to select the SR8 register. In addition, the J counter is incrementd to store the character 3, and the E flipflop is set at the end of the E S-cycle. Thus, during the following E S-cycle, the contents of the A register are recorded in the selected SR8 register. During the next E S-cycle the instruction (0,8) is read from the SR9 register resulting in the character 8 being stored in the 0 register to render the order Memex 08 effective and the character O being placed in the M register to select the LRO register in the bulk memory 24. Note that in this case the M register provides for selecting one of the LR long shift registers of the bulk memory 24, and the N counter is reset to zero and then decremented to SR15 to provide for initially selecting the SR15 register of the working memory. As previously described, the order Memex 08 provides for exchanging the information in the selected LR register, in this case LRO, with the information in the SR15–SR8 (counting down) registers. Thus, as previously described, during the following eight E S-cycles, after the first tf signal is received, the exchange of information called for by the order Memex 08 takes place. At the end of the exchange, the E flipflop is reset, and the next instruction will be obtained from the SR9 register which is now loaded with a new program received from the LRO long shift register.

From the above it should now be clear that the programmer can provide for storing sequences of instructions in the SR registers which provide for operating on the data in any one of the SR registers in accordance with any of the order codes 00 to 015, inclusive.

While the foregoing disclosure has been primarily concerned with a particular exemplary embodiment, it is to be understood that the invention is susceptible of many modifications in construction and arrangement as well as a variety of related uses. The present invention, therefore, is not to be considered as limiting to the specific disclosure provided herein, but is to be considered as including all modifications and variations coming within the scope of the invention as defined in the copending claims.

We claim:

1. A stored program computer comprising
a working memory including a plurality of short shift registers, each said short shift register having its output connected to its input to provide for normally recirculating its contents without change,
a source of clock signals,
a timing counter responding to said clock signals for defining successive character pair periods in said short shift registers,
an instruction address register for storing the address of an instruction located in a specified one of the short shift registers and a specified character pair period therein,
a flipflop for distinguishing an execute cycle and a non-execute cycle of the computer, each said cycle commensurate with a cycle of the short shift register,
an instruction register in the form of a shift register having the capacity of a pair of characters,
said instruction address register being effective during a non-execute cycle of the computer to select a specified one of the short shift registers to shift its output through said instruction register,
a comparator for comparing the successive character pair periods defînged by said timing counter with the specified character pair period stored in said instruction address register and for terminating the shifting of the output of said selected short shift register through said instruction register when agreement is found leaving the specified instruction in said instruction register,
said instruction address register providing for incrementing the specified character pair period stored therein after said comparison has been made, and
a logic network,
the instruction in said instruction register being effective during an execute cycle of the computer to render operable a portion of the logic network and to select a specified one of the short shift registers to suppress the recirculating of its contents without change and to alternately feed its output to and receive its input from said logic network whereby the content of said selected short shift register may be modified.

2. The invention in accordance with claim 1 including an accumulator register in the form of a short shift register having its output connected to its input for normally recirculating its contents without change in synchronism with the short shift registers of the working memory,
said instruction in said instruction register being further effective during an execute cycle of the computer to render operable a portion of the logic network associated with the accumulator register to suppress the recirculating of its contents without change and to alternately feed its output to and receive its input from said logic network whereby the content of said accumulator register may be changed.

3. The invention in accordance with claim 2 wherein the instruction in said instruction register is effective during the execute cycle of the computer to render operable a portion of said logic network which provides for adding the contents of said selected short shift register into the accumulator register.

4. The invention in accordance with claim 2 wherein the instruction in said instruction register is effective during the execute cycle of the computer to render operable a portion of said logic network which provides for transferring the contents of the accumulator register into said selected short shift register.

5. The invention in accordance with claim 2 wherein the instruction in said instruction register is effective during the execute cycle of the computer to render operable a portion of said logic network which provides for transferring the contents of said selected short shift register into said accumulator register.

6. The invention in accordance with claim 2 wherein the instruction in said instruction register is effective during the execute cycle of the computer to render operable a portion of said logic network which provides for exchanging the contents of said selected short shift register with the contents of said accumulator register.

7. The invention in accordance with claim 1 which further comprises a bulk memory including a plurality of long shift registers, each said long shift register having its output connected to its input to provide for normally recirculating its content without change, each said long shift register having a capacity equal to a number of said short shift registers, and wherein the instruction in said instruction register is effective during a number of execute cycles of the computer to select a specified one of the long shift registers and to select a series of short shift registers and to render operable a portion of said logic network which provides for exchanging during each of said number of execute cycles the content of a selected different one of the series of short shift registers with the contents of a different portion of said selected one of said long shift registers.

8. The invention in accordance with claim 7 wherein said timing counter provides an output at the end of each character period, at the end of each character pair period, at the end of each short shift register cycle, and at the end of each long shift register cycle.

9. The invention in accordance with claim 2 including a bit manipulating flipflop coupled to said logic network, wherein the instruction in said instruction register is effective during the execute cycle of the computer to render operable a portion of said logic network which provides for utilizing the bit manipulating flipflop to manipulate the contents of a selected short shift register on a bit-by-bit basis.

10. The invention in accordance with claim 2 including a character manipulating group of flipflops coupled to said logic network, wherein the instruction in said instruction register is effective during the execute cycle of the computer to render operable a portion of said logic network which provides for utilizing the character manipulating flipflops to manipulate the contents of a selected short shift register on a character-by-character basis.

11. The invention in accordance with claim 2 including a bit manipulating flipflop coupled to said logic network, wherein the instruction in said instruction register is effective during the execute cycle of the computer to test the status of said bit manipulating flipflop and to provide for resetting the instruction address register so as to provide for obtaining the next instruction during the following non-execute cycle of the computer from the first character pair period of the selected register if said bit manipulating flipflop is in one state and to provide for obtaining the next instruction during the following non-execute cycle of the computer in accordance with the incremented present content of the instruction register if said bit manipulating flipflop is in the other state.

12. The invention in accordance with claim 2 including a character group of flipflips coupled to said logic network, and wherein the instruction in said instruction register is effective during each of a number of execute cycles of the computer to render operable a portion of said logic network which provides for repeatedly adding the contents of the selected short shift register into the accumulator register for a number of times determined by the character content of the character manipulating group of flipflops.

13. The invention in accordance with claim 2 wherein one of the characters of the instruction in said instruction register is effective during the execute cycle of the computer to render operable a portion of the logic network which provides for clearing the accumulator register after a number of character periods as specified by the other of the characters of the instruction.

14. The invention in accordance with claim 2 wherein one of the characters of the instruction left in said instruction register is effective during the execute cycle of the computer to render operable a portion of the logic network which provides for processing the content of said accumulator register for a number of bit periods represented by the other character of said instruction.

15. The invention in accordance with claim 2 wherein the instruction in said instruction register is effective during the execute cycle of the computer to render operable a portion of the logical network which provides a signal on a selected outgoing line which is used to affect equipment external to the computer.

16. The invention in accordance with claim 2 including a bit manipulating flipflop coupled to said logic network, and wherein the instruction in said instruction register is effective during the execute cycle of the computer to render operable a portion of the logic network which provides for testing the logical level of an incoming line controlled by equipment external to the computer, said bit manipulating flipflop being triggered to a predetermined state if the signal on the incoming line is at a high logical level.

17. The invention in accordance with claim 2 wherein the instruction in said instruction register is effective during the execute cycle of the computer to render operable a portion of said logic network which provides for subtracting the contents of a selected short register from the accumulator register.

18. The invention in accordance with claim 2 wherein the instruction in said instruction register is effective during the execute cycle of the computer to render operable a portion of said logic network which provides for copying the last character of the selected short shift register by shifting it into the character manipulating group of flipflops.

19. The invention in accordance with claim 2 wherein the instruction in said instruction register is effective during the execute cycle of the computer to render operable a portion of said logic network which provides for decrementing the last character in the selected short shift register.

20. A stored program computer comprising a working memory including a plurality of short shift registers, each of said short shift registers having its output connected to its input to provide for normally recirculating its content without change, a bulk memory including a plurality of long shift registers, each of said long shift registers having its output connected to its input to provide for normally recirculating its content without change, each of said long shift registers having a capacity equal to a number of said short shift registers, and processing means including a logic network and an instruction register for operating on data stored in selected ones of said short shift registers of said working memory in accordance with a program of instructions stored in selected other ones of said short shift registers of said working memory, said program of instructions stored in said short shift registers including a memory exchange instruction which enables said processing means to render operable a portion of its logic network for successively connecting the output of each of a number of short shift registers to the input of a selected long shift register and for connecting the output of the selected long shift register successively to the input of each of said number of short shift registers for exchanging the content of each of said number of short shift registers with the content of the selected one of said long shift registers, whereby said processing means is enabled to operate on data stored in selected ones of the short shift registers in accordance with the new program of instructions now stored in selected ones of the short shift registers.

21. The invention in accordance with claim 10 wherein said computer includes a master reset switch which when manually operated provides for resetting to zero said short shift registers, said instruction address register, said instruction register, and said character group of flipflops, wherein said character group of flipflops is connected to successively receive characters from an outside source, and whereby the zero setting of said instruction register provides an initial fill instruction which is effective during each of a number of following execute cycles of the computer to select the short shift register identified by a zero address and to render operable a portion of said logic network which provides for transferring each of the characters received in said character group of flipflops into said selected short shift register. cm 22. In a data processing system:

a working memory including a plurality of short shift registers, each said short shift registers having its output connected to its input to provide for normally recirculating its contents without change, a source of timing signals, a timing counter responding to said clock signals to define successive character pair periods of said short shift register, an output selector having a single output and a plurality of inputs, each associated with the output of a respective short shift register, an input selector having a single input and a plurality of outputs, each associated with the input of a respective short shift register, a logic network having an input connected to the single output of the output selector and having an output connected to the single input of the input selector, an instruction register including an address storage portion and an order storage portion, an instruction address register for storing the address of one of the short shift registers and the character pair period therein in which the next instruction to be performed is located, a control flipflop for distinguishing the execute and non-execute cycles of operation of the data processing system, said instruction address register operable during a cycle of operation to set the output selector in accordance with the address stored therein to enable the output of a selected one of the short shift registers to be connected to the single output of the output selector and shifted through the address portion and the order portion of said instruction register, comparing means for comparing the successive character pair periods of the timing counter with the character pair period of said instruction address register and for terminating said shifting when the instruction being sought is stored in said instruction register, said address portion of the instruction register being effective when said control flipflop is in an execute cycle of operation to set the output selector and the input selector to suppress the recirculating of and to enable the output of a selected one of the short shift registers to be connected to the single output of the output selector and to enable the single input of said input selector to be connected to the input of the selected one of the short shift registers, and said order portion of said instruction register being effective when said control flipflop is in its execute cycle of operation for rendering a portion of said logic network operable, whereby the contents of the selected short shift register is modified in accordance with the portion of the logic network rendered operable.

23. In a data processing system a working memory including a plurality of short shift registers, each said short shift register having its output connected to its input to provide for normally recirculating its content without change;

an output selector having a single output and a plurality of inputs, each associated with the output of a respective short shift register;

an input selector having a single input and a plurality of outputs, each associated with the input of a respective short shift register;

a logic network having an input connected to the single output of the output selector and having an output connected to the single input of the input selector; and an instruction register for storing an instruction including an address portion and an order portion;

said address portion of said instruction register being effective to set said output selector and said input selector to suppress the recirculating of the contents of a selected one of the short shift registers without change by connecting the output of said selected one of the short shift registers to the single output of said output selector and by connecting the single input of said input selector to the input of said selected one of the short shift registers; and said order portion of said instruction register being effective to render a portion of said logic network operable;

whereby said selected one of the short shift registers has its output connected to its input to provide for recirculating its contents as modified by said operable portion of said logic network.

* * * * *

UNITED STATES PATENT OFFICE
CERTIFICATE OF CORRECTION

Patent No. 3,763,475 Dated October 2, 1973

Inventor(s) Stanley P. Frankel et al.

It is certified that error appears in the above-identified patent and that said Letters Patent are hereby corrected as shown below:

Column 3, line 54, for "signal" should read -- signals --. Column 5, line 53, "register" should read -- registers --. Column 6, line 40, cancel "f"; line 42, "E", second occurrence, should read -- E̲ --; line 46, "E" should read -- E̲ --. Column 7, line 4, after "input of the" insert -- f --. Column 10, line 22, "conneted" should read -- connected --. Column 11, line 48, "E" should read -- E̲ --; line 56, "flour" should read -- four --; line 60, cancel "ditit" Column 12, line 32, "cntent" should read -- content --; lines 55 and 60, "E", each occurrence, should read -- E̲ --. Column 5, line 52, column 6, lines 10, 13, 18, 37, 38 and 52, column 7, lines 5, 6, 15, 16, 19, 24, 33, 34, 40 and 41, column 10, line 49, column 11, lines 2, 3, 12, 45 and 51, and column 12, lines 43, 45, 46, 50, 58, 60, 65 and 66, "0", each occurrence, should read -- Ø --. Cancel the originally printed columns 13-22, and insert the corrected columns as shown on the attached sheet.

Signed and sealed this 27th day of August 1974.

(SEAL)
Attest:

McCOY M. GIBSON, JR.
Attesting Officer

C. MARSHALL DANN
Commissioner of Patents